US011259224B2

(12) United States Patent
Liu

(10) Patent No.: US 11,259,224 B2
(45) Date of Patent: Feb. 22, 2022

(54) METHOD FOR DETERMINING CORE NETWORK TYPE DURING HANDOVER PROCESS, TERMINAL DEVICE, ACCESS NETWORK DEVICE, AND CORE NETWORK DEVICE

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/871,932

(22) Filed: May 11, 2020

(65) Prior Publication Data
US 2020/0280893 A1 Sep. 3, 2020

Related U.S. Application Data

(63) Continuation of application No. PCT/CN2017/110714, filed on Nov. 13, 2017.

(51) Int. Cl.
*H04W 36/04* (2009.01)
*H04W 36/00* (2009.01)
(Continued)

(52) U.S. Cl.
CPC ............ *H04W 36/04* (2013.01); *H04W 8/02* (2013.01); *H04W 36/0058* (2018.08); *H04W 36/14* (2013.01)

(58) Field of Classification Search
CPC . H04W 36/0033; H04W 36/36; H04W 76/27; H04W 36/08; H04W 36/0016;
(Continued)

(56) References Cited

U.S. PATENT DOCUMENTS 9,351,212 B2    5/2016  Zhao et al.
9,439,107 B2 *  9/2016  Jha .................... H04W 36/0016
(Continued)

FOREIGN PATENT DOCUMENTS

CN    101730104 A    6/2010
CN    102448137 A    5/2012
(Continued)

OTHER PUBLICATIONS

International Search Report in the international application No. PCT/CN2017/110714, dated Aug. 2, 2018.
(Continued)

*Primary Examiner* — Hanh N Nguyen
(74) *Attorney, Agent, or Firm* — Perkins Coie LLP

(57) ABSTRACT

The present invention provides a method for determining a core network type during a handover process, a terminal device, an access network device, and a core network device. In a process of cell handover, a target access network device may determine the core network type of a target cell according to preferred core network type information reported by a terminal device; alternatively, the target access device may determine the core network type of the target cell by information exchange with a core network device. Therefore, smooth cell handover is ensured, and user experience is improved. The method comprises: during a process of handover of a terminal device from a source cell to a target cell, the terminal device sends preferred core network type information for the target cell to a source access network device, wherein the preferred core network type information is reference information for determining the core network type of the target cell.

4 Claims, 12 Drawing Sheets

(51) Int. Cl.
*H04W 8/02* (2009.01)
*H04W 36/14* (2009.01)

(58) Field of Classification Search
CPC ..... H04W 36/14; H04W 36/12; H04W 36/38; H04W 36/0061; H04W 36/04; H04W 36/0058; H04W 8/02; H04W 88/02; H04W 88/08; H04W 88/14; H04W 36/0055; H04W 88/06
See application file for complete search history.

(56) References Cited

U.S. PATENT DOCUMENTS

| | | |
|---|---|---|
| 10,080,163 B2 * | 9/2018 | Mufti ............... H04W 36/0022 |
| 10,383,046 B2 * | 8/2019 | Bogineni ............ H04W 36/32 |
| 10,470,246 B2 * | 11/2019 | Werner ............. H04W 36/0055 |
| 2010/0027468 A1 | 2/2010 | Rajavelsamy |
| 2010/0074129 A1 | 3/2010 | Hong |
| 2011/0269465 A1 * | 11/2011 | Xu ........................ H04W 36/08 455/436 |
| 2015/0031371 A1 | 1/2015 | Zhao et al. |
| 2015/0117403 A1 | 4/2015 | Akihiko |
| 2017/0013516 A1 * | 1/2017 | Tan Bergstrom .......................... H04W 36/0069 |
| 2019/0159088 A1 * | 5/2019 | Shi ........................ H04W 36/08 |
| 2019/0191349 A1 * | 6/2019 | Kim ...................... H04W 76/18 |
| 2019/0297550 A1 * | 9/2019 | Zhang ............. H04W 36/0069 |

FOREIGN PATENT DOCUMENTS

| | | |
|---|---|---|
| CN | 103379562 A | 10/2013 |
| CN | 104054373 A | 9/2014 |
| EP | 2806690 A1 | 11/2014 |
| EP | 2827642 A1 | 1/2015 |
| JP | 2018537014 A | 12/2018 |
| KR | 20140103330 A | 8/2014 |
| WO | 2014048455 A1 | 4/2014 |
| WO | 2017061111 A1 | 4/2017 |

OTHER PUBLICATIONS

"3rd Generation Partnership Project;Technical Specification Group Services and System Aspects; Procedures for the 5G System; Stage 2(Release 15)", 3GPP TS 23.502 V1.2.0 (Sep. 2017), http://www.3gpp.org.

LG Electronics, "TS 23.502: Clarification on N2 handover procedure", SA WG2 Meeting #123 S2-177362, Oct. 23-27, 2017, Ljubljana, Slovenia.

English translation of the Written Opinion of the International Search Authority in the international application No. PCT/CN2017/110714, dated Aug. 2, 2018.

Samsung: "CN selection for E-UTRAN connected to 5G CN", 3GPP Draft; R2-1707749 LTE 5GCN Selection V06, 3rdGeneration Partnership Project (3GPP), Mobile Competence Centre: 650, Route Des Lucioles ; F-06921 Sophia-Antipolis Cedex France vol. RAN WG2, No. Berlin, Germany; Aug. 21-25, 2017 Aug. 20, 2017 (Aug. 20, 2017), XP051317711, [retrieved on Aug. 20, 2017] * the whole document *.

Huawei et al: "Assistant information to perform CN selection", 3GPP Draft; R2-1711114 Assistant Information To Perform CN Selection, 3rd Generation Partnership Project (3GPP), Mobile Competence Centre; 650, Route Des Lucioles ; F-06921 Sophia-Anti Polis Cedex F vol. RAN WG2, No. Prague, Czech Republic; Oct. 9-13, 2017 Oct. 8, 2017 (Oct. 8, 2017), XP051343122, * the whole document *.

Vivo: "CN selection for LTE connected to 5GC", 3GPP Draft: R2-1710950 CN Selection for LTE Connected To 5GC, 3rd Generation Partnership Project (3GPP), Mobilecompetence Centre ; 650, Route Des Lucioles: F-06921 Sophia-Antipolis Cedex France vol. RAN WG2, No. Prague, Czech Republic; Oct. 9-13, 2017 Oct. 8, 2017 (Oct. 8, 2017), XP051342962, [retrieved on Oct. 8, 2017] *the whole document*.

Partial Supplementary European Search Report in the European application No. 17931192.3, dated Oct. 14, 2020.

Oppo: "Discussion on ANR Functionality for eLTE", 3GPP Draft; [NR-CP] R2-1710183 Discussion On ANR Functionality for eLTE, 3rd Generation Partnership Project (3GPP), Mobile Competence Centre; 650, Route Des Lucioles; F-06921 Sophia-Antipolis Cedex; vol. RAN WG2, No. Prague, Czech Republic; Oct. 9-13, 2017 Sep. 28, 2017 (Sep. 28, 2017), XP051354191, Retrieved from the Internet: URL: http://www.3gpp.org/ftp/tsg_ran/WG2_RL2/TSGR2_99bis/Docs/ [retrieved on Sep. 28, 2017] * the whole document *.

Supplementary European Search Report in the European application No. 17931192.3, dated Feb. 12, 2021.

First Office Action of the Indian application No. 202027024224, dated Jun. 30, 2021. 5 pages with English translation.

First Office Action of the European application No. 17931192.3, dated Sep. 1, 2021. 7 pages.

3GPP TSG-RAN WG2 Meeting #99bis R2-1710305, Prague, Czech Republic, Oct. 9-13, 2017, Source:CATT, Title: Further Consideration for CN selection, Agenda Item:9.7.2, Document for: Discussion and Decision. 7 pages.

3GPP TSG-RAN WG2 Meeting #99bis R2-1711112, Prague, Czech Republic, Oct. 9-13, 2017, Title: Discussion or mobility scenario for E-UTRA conected to 5GC, Source: Huawei, Hisilicon, Agenda item:9.7.2, Document for Discussion. 3 pages.

First Office Action of the Korean application No. 10-2020-7016823, dated Sep. 28, 2021. 12 pages with English translation.

First Office Action of the Japanese application No. 2020-526199, dated Oct. 5, 2021. 16 pages with English translation.

First Office Action of the Chinese application No. 202010339319 2, dated Oct. 11, 2021. 15 pages with English translation.

First Office Action of the Taiwanese application No. 107140195, dated Nov. 19, 2021. 12 pages with English translation.

* cited by examiner

| 500 | During a handover of a terminal device from a source cell to a target cell, a core network device receives information of a preferred core network type for the target cell from a target access network device, where the information of the preferred core network type is reference information for determining the core network type of the target cell | ~ 510 |

The core network device determines the core network type of the target cell according to the information of the preferred core network type ~ 520

FIG. 6

700 — During a handover of a terminal device from a source cell to a target cell, an access network device sends a request message for requesting a core network type of the target cell, where the core network device is not changed during the handover of the terminal device from the source cell to the target cell ~ 710

The access network device receives the core network type of the target cell from the core network device as a feedback for the request message ~ 720

FIG. 8

800 — During a handover of a terminal device from a source cell to a target cell, a core network device receives a request message for requesting a core network type of the target cell from an access network device, where the core network device is not changed during the handover of the terminal device from the source cell to the target cell ~ 810

The core network device determines the core network type of the target cell according to at least one of subscription information of the terminal device, EPS bearer information for the terminal device, PDU session information for the terminal device, or a QoS stream, after receiving the request message ~ 820

During a handover of a terminal device from a source cell to a target cell, a target access network device sends a request message for requesting a core network type of the target cell to a target core network device — 1110

The target access network receives the core network type of the target cell from the target core network as a feedback for the request message — 1120

During a handover of a terminal device from a source cell to a target cell, a target core network device sends a request message for requesting a core network type of the target cell to a source core network device — 1210

The target core network device receives the core network type of the target cell from the source core network as a feedback for the request message — 1220

During a handover of a terminal device from a source cell to a target cell, a source core network device receives a request message for requesting a core network type of the target cell from a target core network device — 1310

The source core network device determines the core network type of the target cell according to at least one of subscription information of the terminal device, EPS bearer information for the terminal device, PDU session information for the terminal device, or a QoS stream — 1320

The source core network device feeds the determined core network type of the target cell back to the target core network device — 1330

FIG. 14

METHOD FOR DETERMINING CORE NETWORK TYPE DURING HANDOVER PROCESS, TERMINAL DEVICE, ACCESS NETWORK DEVICE, AND CORE NETWORK DEVICE

CROSS-REFERENCE TO RELATED APPLICATION

This is a continuation application of International Patent Application No. PCT/CN2017/110714, filed on Nov. 13, 2017, the content of which is incorporated by reference herein in its entirety for all purposes.

TECHNICAL FIELD

Embodiments of the disclosure relate to field of communications, and in more detail to a method for determining a core network type during a handover process, a terminal device, an access network device and a core network device.

BACKGROUND

In a long term evolution (LTE) communication system and a 5th generation (5G) communication system, an evaluated long term evolution (eLTE) access network device (e.g., a base system) can access both an evolved packet core (EPC) network and a 5th generation core (5GC) network. If a terminal device, after performing a handover, accesses such a target cell that may be connected to different core network types, the terminal device has to determine the core network type of the target cell before performing the handover. This is because core networks of different types need different bearers. However, during a current process of a cell handover, such as a handover of a terminal device from an eLTE cell to another eLTE cell or from a new radio (NR) cell to an eLTE cell, neither a source base station nor a target base station knows the type of the core network to which the terminal device will be connected after the handover, thus adversely affecting experience of the cell handover.

BRIEF DESCRIPTION OF DRAWINGS

FIG. 3 illustrates a schematic flow chart of determining a core network type during a handover process according to the embodiments of the disclosure.

FIG. 4 illustrates a schematic flow chart of determining a core network type during another handover process according to the embodiments of the disclosure.

FIG. 5 illustrates a schematic flow chart of determining a core network type during another handover process according to the embodiments of the disclosure.

FIG. 6 illustrates a schematic flow chart of determining a core network type during another handover process according to the embodiments of the disclosure.

FIG. 8 illustrates a schematic flow chart of determining a core network type during another handover process according to the embodiments of the disclosure.

FIG. 9 illustrates a schematic flow chart of determining a core network type during another handover process according to the embodiments of the disclosure.

FIG. 12 illustrates a schematic flow chart of determining a core network type during another handover process according to the embodiments of the disclosure.

FIG. 13 illustrates a schematic flow chart of determining a core network type during another handover process according to the embodiments of the disclosure.

FIG. 14 illustrates a schematic flow chart of determining a core network type during another handover process according to the embodiments of the disclosure.

DETAILED DESCRIPTION

The technical solutions in the embodiments of the disclosure will be described clearly and completely below with reference to the drawings in the embodiments of the disclosure.

The technical solutions in the embodiments of the disclosure can be applied to various communication systems, such as a Long Term Evolution (LTE) system, an LTE Frequency Division Duplex (FDD) system, and an LTE Time Division Duplex (TDD) system, a Universal Mobile Telecommunication System (UMTS), a Worldwide Interoperability for Microwave Access (WiMAX) communication system, a 5G communication system, or the like.

In the disclosure, various embodiments are described in conjunction with an access network device. The access network device in the embodiments of the disclosure may be a device for communicating with a terminal device. The access network device may be an evolved base station (Evolutional NodeB, eNB, or eNodeB) in an LTE system, or a wireless controller in a Cloud Radio Access Network (CRAN) scenario. Or, the access network device may be a relay station, an access point, an in-vehicle device, a wearable device, or a Next Generation Evolutional NodeB (NG)-eNB), an access network device (for example, gNB) in a 5G network, or an access network device in a future evolved Public Land Mobile Network (PLMN), or the like. The embodiments of the disclosure are not limited thereto.

In the disclosure, various embodiments are described with reference to a core network device. The core network device in the embodiment of the disclosure may be a device that communicates with an access network device. The core network device may be a 5G core network device, such as an Access and Mobility Management Function (AMF), or an Evolved Packet Core (EPC) device, such as a Mobility Management Entity (MME).

Figure 1:
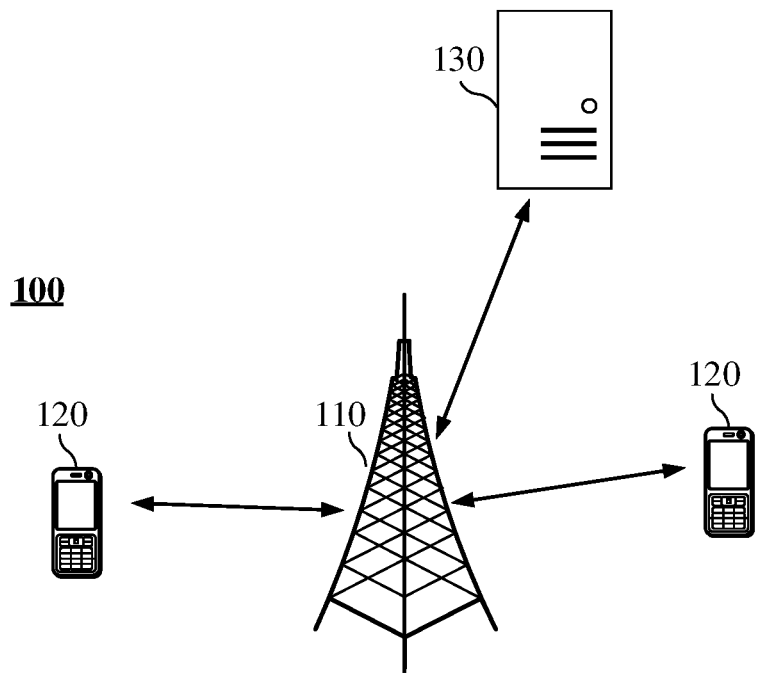
FIG. 1 illustrates a schematic diagram of an application scenario according to the embodiments of the disclosure.

FIG. 1 exemplarily illustrates one access network device, one core network device, and two terminal devices. The wireless communication system 100 may include multiple access network devices, and another number of terminal devices may be included in the coverage of each access network device, which are not limited in the embodiments of the disclosure.

Optionally, the wireless communication system 100 may further include other network entities such as a network controller, a mobility management entity, and the like, which is not limited in the embodiments of the disclosure.

Figure 2:
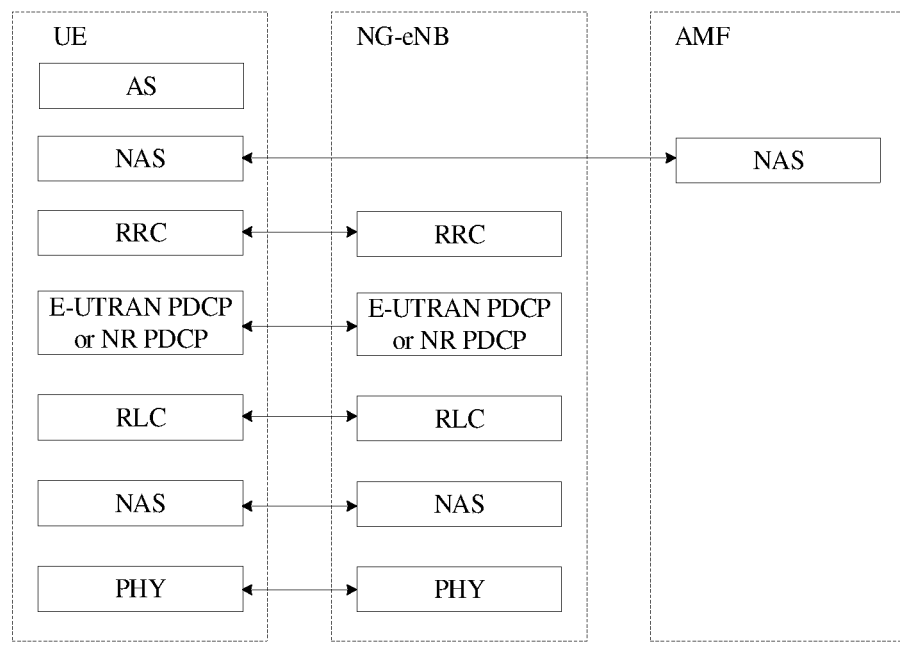
FIG. 2 illustrates a schematic diagram of an architecture of an evaluated long term evolution (eLTE) protocol layer according to the embodiments of the disclosure.

FIG. 2 illustrates a schematic diagram of an architecture of an eLTE protocol layer in the embodiments of the disclosure.

The eLTE means accessing the LTE eNB (ie, NG-eNB) to the 5G core network, where the radio link control (RLC) layer, and the media access control (MAC) layer to the physical (PHY) layer in the protocol stack of the LTE eNB use the LTE protocol, and the Packet Data Convergence Protocol (PDCP) layer may use the LTE Evolved Universal Terrestrial Radio Access Network (E-UTRAN) protocol or the 5G NR protocol.

The PDCP layer of an user equipment (UE) may use the LTE E-UTRAN protocol or the 5G NR protocol, and the PDCP layer of the NG-eNB may also use the LTE E-UTRAN protocol or the 5G NR protocol.

The UE and the NG-eNB are communicatively connected with each other with a radio resource control (RRC) protocol.

The non-access stratum (NAS) of the UE is communicatively connected with the NAS layer of the AMF device.

In the eLTE, there may be a handover from an EPC that supports the LTE protocol to an EPC that supports the LTE protocol, that is, a handover from LTE/EPC to LTE/5GC, and a target cell (the cell after the handover) may support both EPC and 5GC. During the handover process, if the target cell supports both EPC and 5GC, it is necessary to determine the type of the core network, which the terminal device is to access after the handover.

Optionally, the EPC requires packet data unit (PDU) connections and Evolved Packet System (EPS) bearers based on the LTE specification, and 5GC requires PDU sessions and Quality of Service (QoS) flows based on the 5G NR specification.

In addition, various aspects or features of the application may be implemented as methods, apparatuses, or articles of manufacture using standard programming and/or engineering techniques. The term "article of manufacture" as used in the disclosure encompasses a computer program accessible from any computer-readable device, carrier, or medium. For example, the computer-readable media may include, but are not limited to: magnetic storage devices (for example, hard disks, floppy disks, or magnetic tapes, etc.), optical disks (for example, Compact Discs (CDs), Digital Versatile Discs (DVDs), and etc.), smart cards and flash memory devices (for example, Erasable Programmable Read-Only Memory (EPROM), cards, sticks or key drives, etc.). In addition, the various storage media described herein may represent one or more devices and/or other machine-readable media for storing information. The term "machine-readable medium" may include, but is not limited to, various media capable of storing, containing, and/or carrying instructions and/or data.

It should be understood that the terms "system" and "network" are often used interchangeably herein. The term "and/or" in this document is only a kind of association relationship describing related objects, which means that there can be three kinds of relationships, for example, A and/or B can mean: A exists alone, both A and B exist, and B exists alone. In addition, the character "/" in this article generally indicates that the related objects have an "or" relationship.

Embodiments of the disclosure provide a method for determining a core network type during a handover process, a terminal device, an access network device and a core network device, such that during a cell handover, a target access network device can determine a core network type of a target cell by use of information of a preferred core network type reported by the terminal device, or the target access network device can determine the core network type of the target cell through information interaction with the core network device, thus guaranteeing smooth running of the cell handover and improving user experiences.

In the first aspect, the embodiments of the disclosure provide a method for determining a core network type during a handover process, which includes:

during a handover, of a terminal device, from a source cell to a target cell, sending, by the terminal device, information of a preferred core network type for the target cell to a source access network device, where the information of the preferred core network type is reference information for determining a core network type of the target cell.

Alternatively, the core network device may determine the core network type of the target cell by referring to the preferred core network type reported by the terminal device.

It should be understood that during the handover of the terminal device from the source cell to the target cell, an access network device which the terminal device accesses is changed from a source access network device to a target access network device.

As a result, in the method of determining the core network type during the handover according to the embodiments of the disclosure, during the handover of the terminal device from the source cell to the target cell, the terminal device reports the information of the preferred core network type. Therefore, the core network device can determine the core network type of the target cell by referring to the information of the preferred core network type for the target cell, thus guaranteeing smooth running of the cell handover and improving user experiences.

Moreover, it can be avoided that a default core network type is used when the target access network device does not know the core network type of the target cell, which would cause overload or empty load of the core network device.

Alternatively, in an implementation according to the first aspect, the action of sending, by the terminal device, the information of the preferred core network type for the target cell to the source access network device includes:

sending, by a non-access stratum of the terminal device, the information of the preferred core network type to an access stratum of the terminal device;

sending, by the access stratum of the terminal device, the information of the preferred core network type to the source access network device.

Alternatively, the non-access stratum of the terminal device generates the information of the preferred core network type.

Moreover, the NAS of the terminal device generates the information of the preferred core network type for the target cell and reports the same to the source access network device via the AS of the terminal device.

Alternatively, in an implementation of the first aspect, the action of sending, by the terminal device, the information of the preferred core network type for the target cell to the source access network includes:

sending, by the terminal device, a measurement report, which carries the information of the preferred core network type, to the source access network device.

Alternatively, in an implementation of the first aspect, the information of the preferred core network type is: an evolved packet core (EPC) network, a 5th generation (5G) core network, or the 5G core network and the EPC network.

Alternatively, the target access network device performs the cell handover according to the core network type of the target cell.

In the second aspect, the embodiments of the disclosure provide a method for determining a core network type during a handover process, which includes:

during a handover, of a terminal device, from a source cell to a target cell, receiving, by a source access network device, information of a preferred core network type for the target cell from the terminal device, the information of the preferred core network type being reference information for determining the core network type of the target cell; and sending, by the source access network device, the information of the preferred core network type to a target access network device.

Alternatively, the core network device may determine the core network type of the target cell by referring to the preferred core network type reported by the terminal device.

It should be understood that during the handover of the terminal device from the source cell to the target cell, an access network device which the terminal device accesses is changed from a source access network device to a target access network device.

As a result, in the method of determining the core network type during the handover according to the embodiments of the disclosure, during the handover of the terminal device from the source cell to the target cell, the terminal device reports the information of the preferred core network type. Therefore, the core network device can determine the core network type of the target cell by referring to the information of the preferred core network type for the target cell, thus guaranteeing smooth running of the cell handover and improving user experiences.

Alternatively, in an implementation of the second aspect, the action of receiving, by the source access network device, the information of the preferred core network type for the target cell from the terminal device includes:

receiving, by the source access network device, the information of the preferred core network type from the AS of the terminal device.

Alternatively, in an implementation of the second aspect, the action of receiving, by the source access network device, the information of the preferred core network type for the target cell from the terminal device includes:

receiving, by the source access network device, a measurement report from the terminal device, where the report carries the information of the preferred core network type.

Alternatively, in an implementation of the second aspect, the action of sending, by the source access network device, the information of the preferred core network type to the target access network device includes:

sending, by the source access network device, a handover request which includes the information of the preferred core network type, to the target access network device.

Alternatively, the target access device performs the cell handover according to the core network type of the target cell.

Alternatively, in an implementation of the second aspect, the information of the preferred core network is: an evolved packet core (EPC) network, a 5th generation (5G) core network, or the 5G core network and the EPC network.

In the third aspect, the embodiments of the disclosure provide a method for determining a core network type during a handover process, which includes:

during a handover, of a terminal device, from a source cell to a target cell, receiving, by a target access network device, information of a preferred core network type for the target cell from a source access network device, the information of the preferred core network type being reference information for determining the core network type of the target cell; and sending, by the target access network device, the information of the preferred core network type to a core network device, to enable the core network device to determine a core network type of the target cell according to the information of the preferred core network type.

It should be understood that during the handover of the terminal device from the source cell to the target cell, an access network device which the terminal device accesses is changed from a source access network device to a target access network device.

As a result, in the method of determining the core network type during the handover according to the embodiments of the disclosure, during the handover of the terminal device from the source cell to the target cell, the terminal device reports the information of the preferred core network type. Therefore, the core network device can determine the core network type of the target cell by referring to the information of the preferred core network type for the target cell, thus guaranteeing smooth running of the cell handover and improving user experiences.

Alternatively, in an implementation of the third aspect, the action of receiving, by the target access device, the information of the preferred core network type for the target cell from the source access network device includes:

receiving, by the target access network device, a handover request which comprises the information of the preferred core network type.

Alternatively, in an implementation of the third aspect, the information of the preferred core network type is: an evolved packet core (EPC) network, a 5th generation (5G) core network, or the 5G core network and the EPC network.

Alternatively, in an implementation of the third aspect, the method further includes:

receiving, by the target access network device, the core network type of the target cell from the core network device; and performing, by the target access network device, a cell handover according to the core network type of the target cell.

In the fourth aspect, the embodiments of the disclosure provide a method for determining a core network type during a handover process, which includes:

during a handover, of a terminal device, from a source cell to a target cell, receiving, by a core network device, information of a preferred core network type for the target cell from a target access device, the information of the preferred core network type being reference information for determining a core network type of the target cell; and determining, by the core network device, the core network type of the target cell according to the information of the preferred core network type.

It should be understood that during the handover of the terminal device from the source cell to the target cell, an access network device which the terminal device accesses is changed from a source access network device to a target access network device.

As a result, in the method of determining the core network type during the handover according to the embodiments of the disclosure, during the handover of the terminal device from the source cell to the target cell, the terminal device reports the information of the preferred core network type. Therefore, the core network device can determine the core network type of the target cell by referring to the information of the preferred core network type for the target cell, thus guaranteeing smooth running of the cell handover and improving user experiences.

Alternatively, in an implementation of the fourth aspect, the action of determining, by the core network device, the core network type of the target cell according to the information of the preferred core network type includes:

determining, by the core network device, the core network type of the target cell according to at least one of the following: information of the preferred core network type, subscription information of the terminal device, evolved packet system (EPS) bearer information for the terminal device, protocol data unit (PDU) session information for the terminal device, or a quality of service (QoS) flow.

Alternatively, in an implementation of the fourth aspect, the information of the preferred core network type is: an evolved packet core (EPC) network, a 5th generation (5G) core network, or the 5G core network and the EPC network.

Alternatively, in an implementation of the fourth aspect, the method further includes:

feeding, by the core network device, the determined core network type of the target cell back to the target access network device.

Alternatively, the target access network device performs the handover of the cells according to the core network type of the target cell.

In the fifth aspect, the embodiments of the disclosure provide a method for determining a core network type during a handover process, which includes:

during a handover, of a terminal device, from a source cell to a target cell, sending, by an access network device, a request message for requesting a core network type of the target cell, to a core network device, wherein the core network device is not changed during the handover of the terminal device from the source cell to the target cell; and receiving, by the access network device, the core network type of the target cell from the core network device as a feedback for the request message.

It should be understood that, the core network device serving the terminal device is not changed during the handover of the terminal device from the source cell to the target cell.

It should also be understood that during the handover of the terminal device from the source cell to the target cell, an access network device which the terminal device accesses is changed from a source access network device to a target access network device.

As a result, in the method of determining the core network type during the handover according to the embodiments of the disclosure, during the handover of the terminal device from the source cell to the target cell, the access network device sends the request message, for requesting the core network type of the target cell, to the core network device. Therefore, the core network device can determine the core network type of the target cell, thus guaranteeing smooth running of the cell handover and improving user experiences.

Alternatively, in an implementation of the fifth aspect, during the handover of the terminal device from the source cell to the target cell, the access network device may be the source access network device or the target access network device.

Alternatively, when the access network device is the source access network device, the access network device sends the request message to the core network device via an S1 interface or an N2 interface, and receives the core network type of the target cell feedback the core network device.

Alternatively, when the access network device is the target access network device, the access network device sends the request message to the core network device via the S1 interface or the N2 interface, and receives the core network type of the target cell feedback by the core network device.

Alternatively, in an implementation of the fifth aspect, the method further includes:

performing, by the access network device, the cell handover according to core network type of the target cell.

Alternatively, in an implementation of the fifth aspect, the information of the core network type of the target cell is: an evolved packet core (EPC) network, a 5th generation (5G) core network, or the 5G core network and the EPC network.

Alternatively, in an implementation of the fifth aspect, the core network device is an access and mobility management function (AMF), a mobility management entity (MME), a unified data manager (UDM), or a home subscriber server (HSS).

In the sixth aspect, the embodiments of the disclosure provide a method for determining a core network type during a handover process, which includes:

during a handover, of a terminal device, from a source cell to a target cell, receiving, by a core network device, a request message for requesting a core network type of a target cell, from an access network device, wherein the core network device is not changed during the handover of the terminal device from the source cell to the target cell;

determining, by the core network device after receiving the request message, the core network type of the target cell according to at least one of the following: subscription information of the terminal device, evolved packet system (EPS) bearer information for the terminal device, protocol data unit (PDU) session information for the terminal device, or a quality of service (QoS) flow.

It should be understood that, the core network device serving the terminal device is not changed during the handover of the terminal device from the source cell to the target cell.

It should also be understood that during the handover of the terminal device from the source cell to the target cell, an access network device which the terminal device accesses is changed from a source access network device to a target access network device.

As a result, in the method of determining the core network type during the handover according to the embodiments of the disclosure, during the handover of the terminal device from the source cell to the target cell, the access network device sends the request message, for requesting the core network type of the target cell, to the core network device, so that the core network device can determine the core network type of the target cell according to subscription information of the terminal device, EPS bearer information for the terminal device, DU session information for the terminal device, or a QoS flow, thus guaranteeing smooth running of the cell handover and improving user experiences.

Alternatively, in an implementation of the sixth aspect, during the handover of the terminal device from the source cell to the target cell, the access device may be the source access network device or the target access network device.

Alternatively, when the access network device is the source access network device, the access network device sends the request message to the core network device via an S1 interface or an N2 interface, and receives the core network type of the target cell feedback by the core network device.

Alternatively, when the access network device is the target access network device, the access network device sends the request message to the core network device via the S1 interface or the N2 interface, and receives the core network type of the target cell feedback by the core network device.

Alternatively, in an implementation of the sixth aspect, the method further includes:

The core network device sends the core network type of the target cell to the access network device.

Alternatively, the access network device performs the cell handover according to the core network type of the target cell.

Alternatively, in an implementation of the sixth aspect, the core network device is an access and mobility management function (AMF), a mobility management entity (MME), a unified data manager (UDM), or a home subscriber server (HSS).

In the seventh aspect, the embodiments of the disclosure provide a method for determining a core network type during a handover process, which includes:

during a handover, of a terminal device, from a source cell to a target cell, sending, by a target access network device, a request message for requesting a core network type of the target cell, to a target core network device; and receiving, by the target access network device, the core network type of the target cell from the target core network device as a feedback for the request message.

Alternatively, the target core network device sends the request message to a source core network device, to cause the source core network device to determine the core network type of the target cell.

It should be understood that, during the handover of the terminal device from the source cell to the target cell, the core network device serving the terminal device is changed from the source core network device to the target core network device.

It should also be understood that, during the handover of the terminal device from the source cell to the target cell, the access network device which the terminal device accesses is changed from the source access network device to the target access network device.

As a result, in the method of determining the core network type during the handover according to the embodiments of the disclosure, during a handover, of a terminal device, from a source cell to a target cell, the target access network device sends the request message, for requesting the core network type of the target cell, to the target core network device, and target core network device sends the request message to the source core network device, so that the source core network device can determine the core network type of the target cell, thus guaranteeing smooth running of the cell handover and improving user experiences.

Alternatively, in an implementation of the seventh aspect, the method further includes:

performing, by the target access network device, the cell handover according to the core network type of the target cell.

Alternatively, in an implementation of the seventh aspect, the information of the core network type of the target cell is: an evolved packet core (EPC) network, a 5th generation (5G) core network, or the 5G core network and the EPC network.

Alternatively, in an implementation of the seventh aspect, the source core network device is: an access and mobility management function (AMF), a mobility management entity (MME), a unified data manager (UDM), or a home subscriber server (HSS).

In the eighth aspect, the embodiments of the disclosure provide a method for determining a core network type during a handover process, which includes:

during a handover, of a terminal device, from a source cell to a target cell, sending, by a target core network device, a request message for requesting a core network type of the target cell, to a source core network device; and receiving, by the target core network device, the core network type of the target cell from the target core network device as a feedback for the request message.

It should be understood that, during the handover of the terminal device from the source cell to the target cell, the core network device serving the terminal device is changed from the source core network device to the target core network device.

It should also be understood that, during the handover of the terminal device from the source cell to the target cell, the access network device which the terminal device accesses is changed from a source access network device to a target access network device.

As a result, in the method of determining the core network type during the handover according to the embodiments of the disclosure, during the handover of the terminal device from the source cell to the target cell, the target core network device sends the request message, for requesting the core network type of the target cell, to the source core network device, so that the source core network device can determine the core network type of the target cell, thus guaranteeing smooth running of the cell handover and improving user experiences.

Alternatively, in an implementation of the eighth aspect, before the target core network device sends the request message to the source core network device, the method further includes:

receiving, by the target core network device, the request message from the target access network device.

Alternatively, in an implementation of the eighth aspect, the method further includes:

sending, by the target core network device, the core network type of the target cell to the target access network device, to enable the target access network device to perform the handover of the cells according to the core network type of the target cell.

Alternatively, in an implementation of the eighth aspect, the information of the core network type of the target cell is: an evolved packet core (EPC) network, a 5th generation (5G) core network, or the 5G core network and the EPC network.

Alternatively, in an implementation of the eighth aspect, the source core network device is an access and mobility management function (AMF), a mobility management entity (MME), a unified data manager (UDM), or a home subscriber server (HSS).

Alternatively, in an implementation of the eighth aspect, the target core network device is an AMF, an MME, a UDM or a HSS.

In the ninth aspect, the embodiments of the disclosure provide a method for determining a core network type during a handover process, which includes:

during a handover, of a terminal device, from a source cell to a target cell, receiving, by a source core network device, a request message for requesting the core network type of a target cell from a target core network device;

determining, by the source core network device, the core network type of the target cell according to at least one of subscription information of the terminal device, EPS bearer information for the terminal device, PDU session information for the terminal device, or a QoS flow;

feeding, by the source core network device, the determined core network type of the target cell back to the target core network device.

It should be understood that, during the handover of the terminal device from the source cell to the target cell, the core network device serving the terminal device is changed from the source core network device to the target core network device.

It should also be understood that, during the handover of the terminal device from the source cell to the target cell, the access network device which the terminal device accesses is changed from the source access network device to the target access network device.

As a result, in the method of determining the core network type during the handover according to the embodiments of the disclosure, during a handover, of a terminal device, from a source cell to a target cell, the target core network device sends the request message, for requesting the core network type of the target cell, to the source core network device, so that the source core network device can determine the core network type of the target cell, thus guaranteeing smooth sunning of the cell handover and improving user experiences.

Alternatively, the target access network device performs the cell handover according to the core network type of the target cell.

Alternatively, in an implementation of the ninth aspect, the information of the core network type of the target cell is an evolved packet core (EPC) network, a 5th generation (5G) core network, or the 5G core network and the EPC network.

Alternatively, in an implementation of the ninth aspect, the source core network device is an access and mobility management function (AMF), a mobility management entity (MME), a unified data manager (UDM), or a home subscriber server (HSS).

Alternatively, in an implementation of the ninth aspect, the target core network device is an AMF, an MME, a UDM or a HSS.

In the tenth aspect, the embodiments of the disclosure provide a terminal device which can execute the modules or units in the method according to the first aspect or any of the implementations of the first aspect.

In the eleventh aspect, the embodiments of the disclosure provide an access network device which can execute the modules or units in the method according to the second aspect or any of the implementations of the second aspect.

In the twelfth aspect, the embodiments of the disclosure provide an access network device which can execute the modules or units in the method according to the third aspect or any of the implementations of the third aspect.

In the thirteenth aspect, the embodiments of the disclosure provide a core network device which can execute the modules or units in the method according to the fourth aspect or any of the implementations of the fourth aspect.

In the fourteenth aspect, the embodiments of the disclosure provide an access network device which can execute the modules or units in the method according to the fifth aspect or any of the implementations of the fifth aspect.

In the fifteenth aspect, the embodiments of the disclosure provide a core network device which can execute the modules or units in the method according to the sixth aspect or any of the implementations of the sixth aspect.

In the sixteenth aspect, the embodiments of the disclosure provide an access network device which can execute the modules or units in the method according to the seventh aspect or any of the implementations of the seventh aspect.

In the seventeenth aspect, the embodiments of the disclosure provide a core network device which can execute the modules or units in the method according to the eighth aspect or any of the implementations of the eighth aspect.

In the eighteenth aspect, the embodiments of the disclosure provide a core network device which can execute the modules or units in the method according to the ninth aspect or any of the implementations of the ninth aspect.

In the nineteenth aspect, a terminal device is provided. The terminal device includes a processor, a memory and a communication interface. The processor is connected to the memory and the communication interface. The memory is configured to store instructions, the processor is configured to execute the instructions, and the communication interface is configured to communicate with other network elements under control of the processor. When the processor is executing the instructions stored in the memory, the execution causes the processor execute the method according to the first aspect or any of the possible implementations in the first aspect.

In the twentieth aspect, an access network device is provided. The access network device includes a processor, a memory and a communication interface. The processor is connected to the memory and the communication interface. The memory is configured to store instructions, the processor is configured to execute the instructions, and the communication interface is configured to communicate with other network elements under control of the processor. When the processor is executing the instructions stored in the memory, the execution causes the processor execute the method according to the second aspect or any of the possible implementations in the second aspect.

In the twenty-first aspect, an access network device is provided. The access network device includes a processor, a memory and a communication interface. The processor is connected to the memory and the communication interface.

The memory is configured to store instructions, the processor is configured to execute the instructions, and the communication interface is configured to communicate with other network elements under control of the processor. When the processor is executing the instructions stored in the memory, the execution causes the processor execute the method according to the third aspect or any of the possible implementations in the third aspect.

In the twenty-second aspect, a core network device is provided. The core network device includes a processor, a memory and a communication interface. The processor is connected to the memory and the communication interface. The memory is configured to store instructions, the processor is configured to execute the instructions, and the communication interface is configured to communicate with other network elements under control of the processor. When the processor is executing the instructions stored in the memory, the execution causes the processor execute the method according to the fourth aspect or any of the possible implementations in the fourth aspect.

In the twenty-third aspect, an access network device is provided. The access network device includes a processor, a memory and a communication interface. The processor is connected to the memory and the communication interface. The memory is configured to store instructions, the processor is configured to execute the instructions, and the communication interface is configured to communicate with other network elements under control of the processor. When the processor is executing the instructions stored in the memory, the execution causes the processor execute the method according to the fifth aspect or any of the possible implementations in the fifth aspect.

In the twenty-fourth aspect, a core network device is provided. The core network device includes a processor, a memory and a communication interface. The processor is connected to the memory and the communication interface. The memory is configured to store instructions, the processor is configured to execute the instructions, and the communication interface is configured to communicate with other network elements under control of the processor. When the processor is executing the instructions stored in the memory, the execution causes the processor execute the method according to the sixth aspect or any of the possible implementations in the sixth aspect.

In the twenty-fifth aspect, an access network device is provided. The access network device includes a processor, a memory and a communication interface. The processor is connected to the memory and the communication interface. The memory is configured to store instructions, the processor is configured to execute the instructions, and the communication interface is configured to communicate with other network elements under control of the processor. When the processor is executing the instructions stored in the memory, the execution causes the processor execute the method according to the seventh aspect or any of the possible implementations in the seventh aspect.

In the twenty-sixth aspect, an access network device is provided. The access network device includes a processor, a memory and a communication interface. The processor is connected to the memory and the communication interface. The memory is configured to store instructions, the processor is configured to execute the instructions, and the communication interface is configured to communicate with other network elements under control of the processor. When the processor is executing the instructions stored in the memory, the execution causes the processor execute the method according to the eighth aspect or any of the possible implementations in the eighth aspect.

In the twenty-seventh aspect, a core network device is provided. The core network device includes a processor, a memory and a communication interface. The processor is connected to the memory and the communication interface. The memory is configured to store instructions, the processor is configured to execute the instructions, and the communication interface is configured to communicate with other network elements under control of the processor. When the processor is executing the instructions stored in the memory, the execution causes the processor execute the method according to the ninth aspect or any of the possible implementations in the ninth aspect.

In the twenty-eighth aspect, a computer readable medium is provided. The computer readable medium is configured to store a computer program which includes instructions for executing any of the above methods or any of the above possible implementations.

In the twenty-ninth aspect, a computer program product is provided. The computer program product, when running on a computer, causes the computer to execute any of the above methods or any the above possible implementations.

Figures 3, 4, 5:
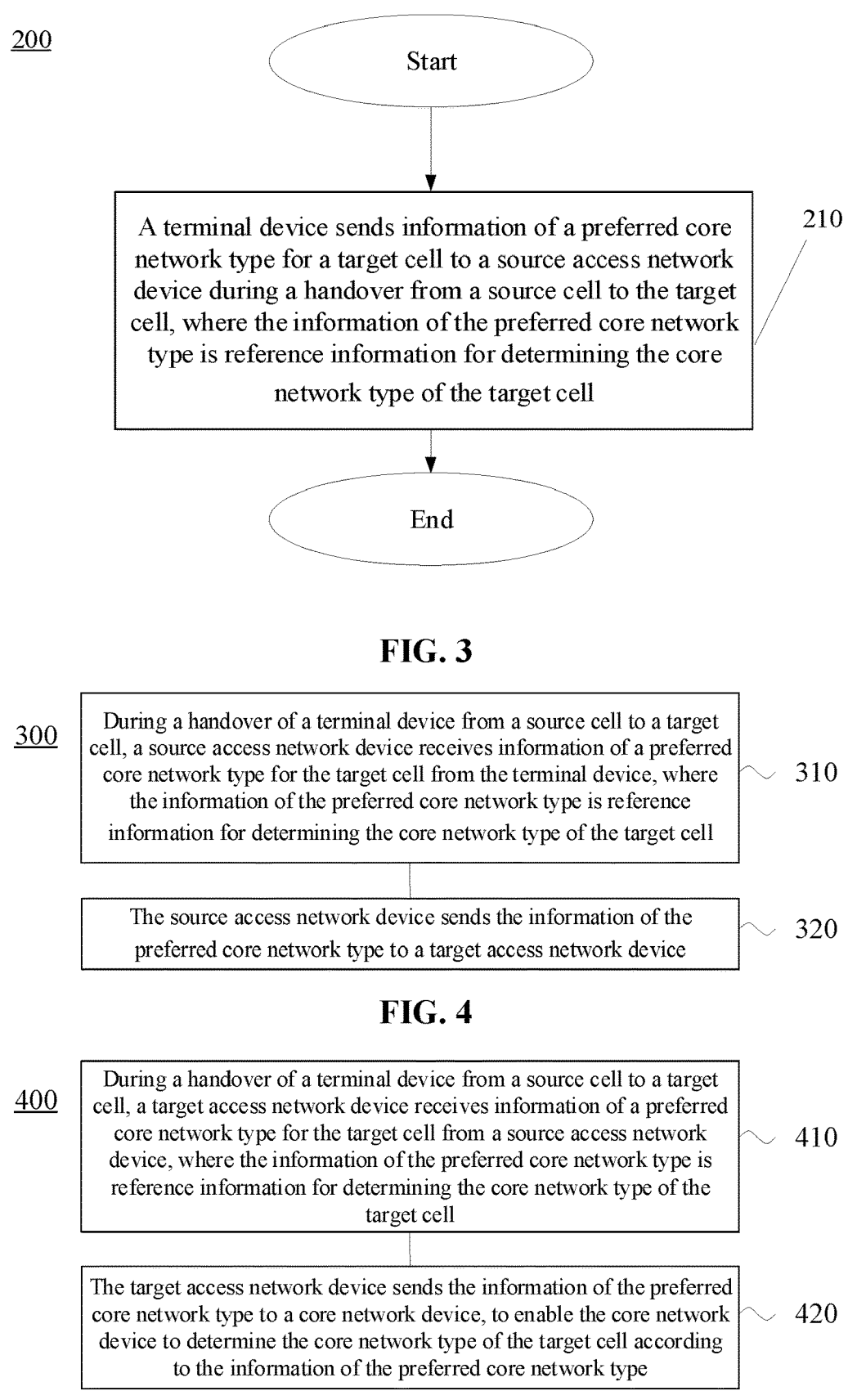

FIG. 3 illustrates a schematic flowchart of a method 200 for determining a core network type during a handover process according to an embodiment of the disclosure. The method 200 may be applied to the system illustrated in FIG. 1. The terminal device, the source access network device, the target access network device, and the core network device in the method 200 may meet the eLTE protocol layer architecture illustrated in FIG. 2, but is not limited thereto. The method 200 includes at least part of the following content.

In 210, during the handover of the terminal device from the source cell to the target cell, the terminal device sends information of a preferred core network type for the target cell to the source access network device, where the information of the preferred core network type is reference information for determining the core network type of the target cell.

It should be understood that, during the handover of the terminal device from the source cell to the target cell, the access network device that the terminal device accesses is changed from the source access network device to the target access network device.

Optionally, the source access network device may be an eNB or a gNB.

Optionally, the target access network device may be an eNB or a gNB.

It should be understood that, when the terminal device camps on the source cell, the terminal device accesses the source access network device, and the terminal device performs signaling interaction with the core network device through the source access network device.

It should be understood that, when the terminal device camps on the target cell, the terminal device accesses the target access network device, and the terminal device performs signaling interaction with the core network device through the target access network device.

Optionally, the core network device may be unchanged during the handover of the terminal device from the source cell to the target cell. At this time, the core network device may implement related functions implemented by the source core network device and the target core through interprocess signaling interaction.

For example, during the handover of the terminal device from cell A to cell B, the core network device AMF remains unchanged.

Optionally, the core network device may be changed during the handover of the terminal device from the source cell to the target cell. At this time, the core network device may be changed from the source core network device to the target core network device, and the terminal device performs signaling interaction with the source core network device through the source access network device, the terminal device interacts with the target core network device through the target access network device, the source access network device and the target access network device can also implement signaling interaction, and the source core network device and the target core network device can also implement signaling interaction.

For example, during the handover of the terminal device from cell C to cell D, the core network device is changed from AMF to MME.

For another example, during the handover of the terminal device from cell E to cell F, the core network device is changed from AMF 1 to AMF 2.

Optionally, during the handover of the terminal device from the source cell to the target cell, the radio access technology (RAT) of the terminal device is not changed, and the core network device is changed. For example, the RAT of the terminal device is eLTE, and the core network device is changed from 5GC to EPC.

Optionally, when determining the core network type of the target cell, the core network device may refer to the information of the preferred core network type for the target cell.

Optionally, after determining the core network type of the target cell, the target access network device may perform cell handover according to the core network type of the target cell.

Optionally, the information of the preferred core network type for the target cell may be one or more core network types that the terminal device preferentially considers for the target cell.

Optionally, the non-access stratum of the terminal device may send the information of the preferred core network type to the access stratum of the terminal device, and the access stratum of the terminal device may send the information of the preferred core network type to the source access network device.

Optionally, the non-access stratum of the terminal device may generate the information of the preferred core network type for the target cell.

Optionally, the terminal device may send a measurement report to the source access network device, where the measurement report carries the information of the preferred core network type.

Optionally, the information of the preferred core network type may be EPC, or 5GC, or 5GC and EPC.

Therefore, in the method for determining the core network type during the handover process in the embodiment of the disclosure, during the handover of the terminal device from the source cell to the target cell, the terminal device reports the information of the preferred core network type for the target cell, so that the core network device can determine the core network type of the target cell by referring to the information of the preferred core network type for the target cell, thereby guaranteeing the smooth running of the cell handover and improving the user experiences.

Moreover, it can be avoided that a default core network type is used when the target access network device does not know the core network type of the target cell, which would cause overload or empty load of the core network device.

FIG. 4 illustrates a schematic flowchart of a method 300 for determining a core network type during a handover process according to an embodiment of the disclosure. The method 300 may be applied to the system illustrated in FIG. 1. In the method 300, a terminal device, a source access network device, a target access network device, and a core network device may meet the eLTE protocol layer architecture illustrated in FIG. 2, but is not limited thereto. The method 300 includes at least a part of the following content.

In 310, during a handover of a terminal device from a source cell to a target cell, the source access network device receives information of a preferred core network type for the target cell from the terminal device. The information of the preferred core network type is reference information for determining a core network type of the target cell.

In 320, the source access network device sends the information of the preferred core network type to the target access network device.

Optionally, the source access network device may receive the information of the preferred core network type from the access stratum of the terminal device.

Optionally, the source access network device may receive a measurement report from the terminal device, where the measurement report carries the information of the preferred core network type.

Optionally, the source access network device may send a handover request to the target access network device, where the handover request includes the information of the preferred core network type.

Optionally, the information of the preferred core network type may be EPC, or 5GC, or 5GC and EPC.

It should be understood that, for the steps in the method 300 for determining the core network type during the handover process, the description of the corresponding steps in the method 200 for determining the core network type during the handover process may be referred to. For brevity, details will not be repeated here.

Therefore, in the method for determining the core network type during the handover process in the embodiment of the disclosure, during the handover of the terminal device from the source cell to the target cell, the terminal device reports the information of the preferred core network type for the target cell, so that the core network device determines the core network type of the target cell by referring to the information of the preferred core network type for the target cell, thereby guaranteeing the smooth running of the cell handover and improving the user experiences.

Moreover, it can be avoided that a default core network type is used when the target access network device does not know the core network type of the target cell, which would cause overload or empty load of the core network device.

FIG. 5 illustrates a schematic flowchart of a method 400 for determining a core network type during a handover process according to an embodiment of the disclosure. The method 400 may be applied to the system illustrated in FIG. 1. In the method 400, a terminal device, a source access network device, a target access network device, and a core network device may meet the eLTE protocol layer architecture illustrated in FIG. 2, but is not limited thereto. The method 400 includes at least part of the following content.

In 410, during a handover of the terminal device from a source cell to a target cell, the target access network device receives information of a preferred core network type for the target cell from the source access network device. The information of the preferred core network type is reference information for determining a core network type of the target cell.

In 420, the target access network device sends the information of the preferred core network type to the core network device, so that the core network device determines the core network type of the target cell according to the information of preferred core network type.

Optionally, the target access network device may receive a handover request from the source access network device, where the handover request includes the information of the preferred core network type.

Optionally, the information of the preferred core network type may be EPC, or 5GC, or 5GC and EPC.

Optionally, the method 400 further includes that, the target access network device may receive the core network type of the target cell from the core network device; and the target access network device performs cell handover according to the core network type of the target cell.

It should be understood that, for the steps in the method 400 for determining the core network type during the handover process, the description of the corresponding steps in the method 200 for determining the core network type during the handover process may be referred to. For brevity, details will not be repeated here.

Therefore, in the method for determining the core network type during the handover process in the embodiment of the disclosure, during the handover of the terminal device from the source cell to the target cell, the terminal device reports the information of the preferred core network type for the target cell, so that the core network device can determine the core network type of the target cell by referring to the information of the preferred core network type for the target cell, thereby guaranteeing the smooth running of cell handover and improving the user experiences.

Moreover, it can be avoided that a default core network type is used when the target access network device does not know the core network type of the target cell, which would cause overload or empty load of the core network device.

FIG. 6 illustrates a schematic flowchart of a method 500 for determining a core network type during a handover process according to an embodiment of the disclosure. The method 500 may be applied to the system illustrated in FIG. 1. In the method 500, a terminal device, a source access network device, a target access network device, and a core network device may meet the eLTE protocol layer architecture illustrated in FIG. 2, which, however is not limited thereto. The method 500 includes at least part of the following content.

In 510, during a handover of a terminal device from a source cell to a target cell, the core network device receives information of the preferred core network type for the target from the target access network device. The information of the preferred core network type is reference information for determining a core network type of the target cell.

In 520, the core network device determines a core network type of the target cell according to the information of preferred core network type.

Optionally, the core network device may determine the core network type of the target cell according to at least one of the following: information of the preferred core network type, subscription information of the terminal device, evolved packet system (EPS) bearer information for the terminal device, protocol data unit (PDU) session information for the terminal device, or a quality of service (QoS) flow.

Optionally, the information of the preferred core network type may be EPC, or 5GC, or 5GC and EPC.

Optionally, the method 500 may further include that, the core network device feeds the determined core network type of the target cell back to the target access network device.

It should be understood that, for the steps in the method 500 for determining the core network type during the handover process, the description of the corresponding steps in the method 200 for determining the core network type during the handover process may be referred to. For brevity, details will not be repeated here.

Therefore, in the method for determining the core network type during the handover process in the embodiment of the disclosure, during the handover of the terminal device from the source cell to the target cell, the terminal device reports the information of the preferred core network type for the target cell, so that the core network device determines the core network type of the target cell by referring to the information of the preferred core network type for the target cell, thereby guaranteeing smooth running of the cell handover and improving the user experiences.

Moreover, it can be avoided that a default core network type is used when the target access network device does not know the core network type of the target cell, which would cause overload or empty load of the core network device.

Figure 7:
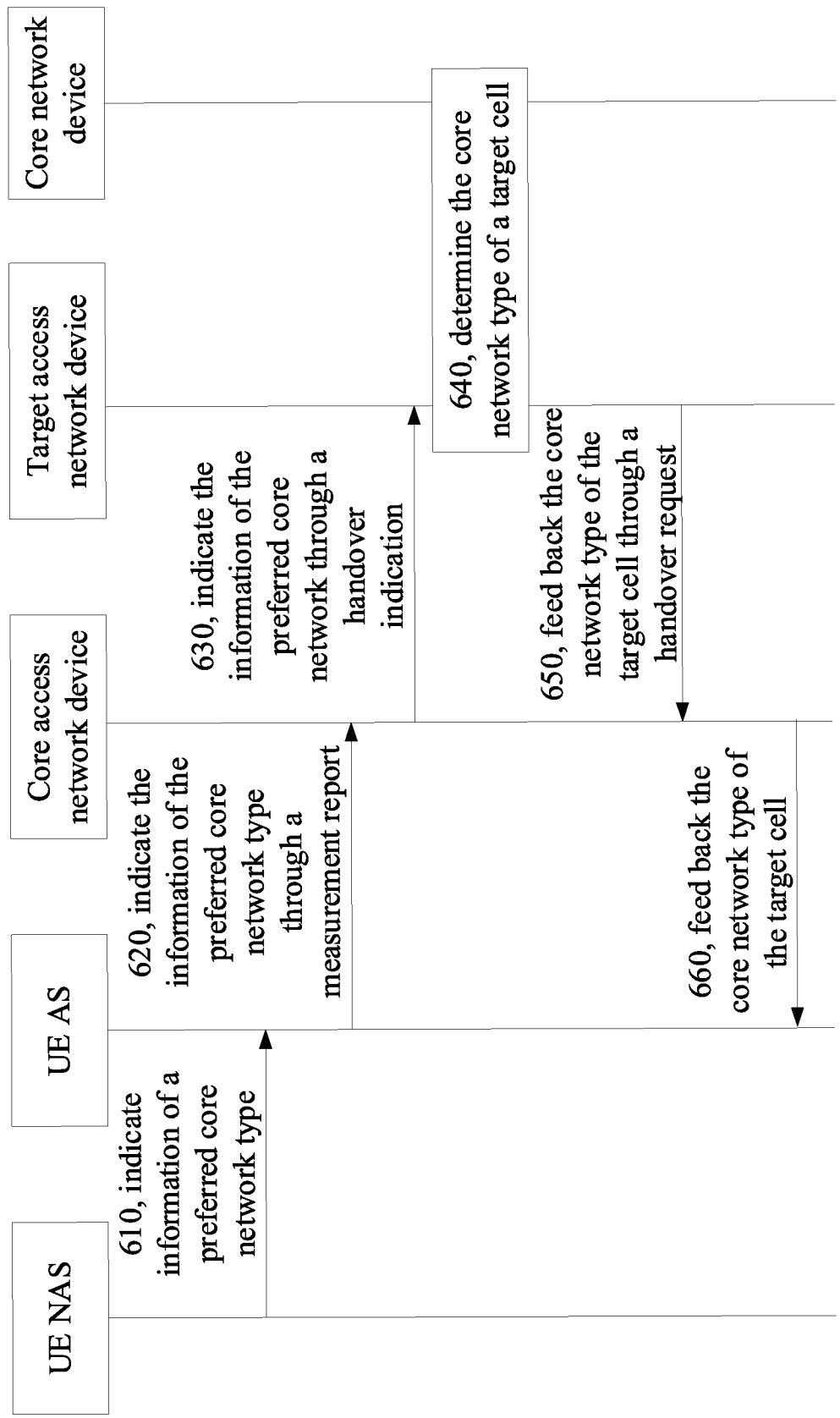
FIG. 7 illustrates a schematic flow chart of a handover process according to the embodiments of the disclosure.

Optionally, as an embodiment, as illustrated in FIG. 7, a non-access stratum of the terminal device, an access stratum of the terminal device, a source access network device, a target access network device, and a core network device may perform information interaction, so that the core network device determines the core network type of the target cell according to the information of the preferred core network type for the target cell reported by the terminal device. The specific process is illustrated in method 600.

In 610, during a handover of a UE from a source cell to a target cell, the non-access stratum (NAS) of the UE sends indication information to the access stratum (AS) of the UE, where the indication information indicates information of a preferred core network type for the target cell.

In 620, the UE AS reports a measurement report to the source access network device, the measurement report carries the information of a preferred core network type for the target cell.

Optionally, the measurement report may also carry some other information, which is not limited in the disclosure.

In 630, the source access network device sends a handover request to the target access network device, where the handover request carries the information of the preferred core network type for the target cell.

Optionally, the handover request may also carry some other information, which is not limited in the disclosure.

In 640, the target access network device sends the information of the preferred core network type for the target cell to the core network device. Therefore, when determining the core network type of the target cell, the core network device refers to the information of the preferred core network type for the target cell.

In 650, after the core network device determines the core network type of the target cell, the target access network device feeds a first response message for the handover request back to the source access network device, where the first response message carries the core network type of the target cell.

In 660, the source access network device feeds second response information back to the UE AS, where the second response message carries the core network type of the target cell.

Therefore, the terminal device can know the core network type of the target cell.

It should be understood that the above method 600 corresponds to the corresponding steps in method 200, method 300, method 400, and method 500, and for the steps in the above method 600, the description of the corresponding steps in method 200 for determining the core network type during the handover process can be referred to. For brevity, details will not be repeated here.

FIG. 8 illustrates a schematic flowchart of a method 700 for determining a core network type during a handover process according to an embodiment of the disclosure. The method 700 may be applied to the system illustrated in FIG. 1. In the method 700. a terminal device, a source access network device, a target access network device, and a core network device may meet the eLTE protocol layer architecture illustrated in FIG. 2, but is not limited thereto. The method 700 includes at least a part of the following content.

In 710, during a handover of the terminal device from a source cell to a target cell, the access network device sends a request message to the core network device, where the request message is used to request the core network type of the target cell. The core network device is not changed during the handover of the terminal device from the source cell to the target cell.

Optionally, the access network device may be a source access network device, and the source access network device sends the request message to the core network device through an S1 interface or an N2 interface.

For example, the eNB sends the request message to the MME through the S1 interface.

Optionally, the access network device may be a target access network device, and the target access network device sends the request message to the core network device through an S1 interface or an N2 interface.

For example, the gNB sends the request message to the AMF through the N2 interface.

Optionally, the request message may carry some information about the terminal device, for example, identification information of the terminal device, and/or, a Global Cellular Identity (GCI) of the target cell.

In 720, the access network device receives the core network type of the target cell from the core network device as a feedback for the request message.

Optionally, the core network device may determine the core network type of the target cell based on at least one of subscription information of the terminal device, evolved packet system (EPS) bearer information for the terminal device, protocol data unit (PDU) session information for the terminal device, or a quality of service (QoS) flow.

It should be understood that the core network device may also determine the core network type of the target cell with assistance of some other information of the terminal device, which is not limited in the disclosure.

Optionally, the method 700 may further include that, the access network device performs cell handover according to the core network type of the target cell.

Optionally, the core network type information of the target cell may be evolved packet core (EPC), or 5G core network, or 5G core network and EPC.

Optionally, the core network device may be an access and mobility management function (AMF), a mobility management entity (MME), a unified data manager (UDM), or a home subscriber server (HSS).

It should be understood that, for the steps in the method 700 for determining the core network type during the handover process, the description of the corresponding steps in the method 200 for determining the core network type during the handover process may be referred to. For brevity, details will not be repeated here.

Therefore, in the method for determining the core network type during the handover process in the embodiment of the disclosure, during the handover of the terminal device from the source cell to the target cell, the access network device sends a request message for requesting the core network type of the target cell to the core network device, so that the core network device can determine the core network type of the target cell according to at least one of the following: information of the preferred core network type, subscription information of the terminal device, evolved packet system (EPS) bearer information for the terminal device, protocol data unit (PDU) session information for the terminal device, or a quality of service (QoS) flow, thereby guaranteeing smooth running of the cell handover and improving the user experiences.

FIG. 9 illustrates a schematic flowchart of a method 800 for determining a core network type during a handover process according to an embodiment of the disclosure. The method 800 may be applied to the system illustrated in FIG. 1. In the method 800, a terminal device, an access network device, and a core network device may meet the eLTE protocol layer architecture illustrated in FIG. 2, but is not limited thereto. The method 800 includes at least a part of the following content.

In 810, during a process in which the terminal device is performing the handover from a source cell to a target cell, the core network device receives a request message for requesting a core network type of a target cell, from the access network device. The core network device is not changed during the handover of the terminal device from the source cell to the target cell.

In 820, After receiving the request message, the core network device determines the core network type of the target cell according to at least one of the following: subscription information of the terminal device, evolved packet system (EPS) bearer information for the terminal device, protocol data unit (PDU) session information for the terminal device, or a quality of service (QoS) flow.

Optionally, the method 800 may further include that, the core network device feeds the core network type of the target cell back to the access network device.

Optionally, the core network type information of the target cell may be evolved packet core (EPC), or 5G core network, or 5G core network and EPC.

Optionally, the core network device may be an AMF, or an MME, or a UDM, or an HSS. It should be understood that, for the steps in the method 800 for determining the core network type during the handover process, the description of the corresponding steps in the method 200 for determining the core network type during the handover process or the method 700 for determining the core network type during the handover process may be referred to. For brevity, details will not be repeated here.

Therefore, in the method for determining the core network type during the handover process in the embodiment of the disclosure, during the handover of the terminal device from the source cell to the target cell, the access network device sends a request message for requesting the core network type of the target cell to the core network device, so that the core network device can determine the core network type of the target cell according to at least one of the following: information of the preferred core network type, subscription information of the terminal device, evolved packet system (EPS) bearer information for the terminal device, protocol data unit (PDU) session information for the terminal device, or a quality of service (QoS) flow, thereby guaranteeing smooth running of the cell handover and improving the user experiences.

Figure 10:
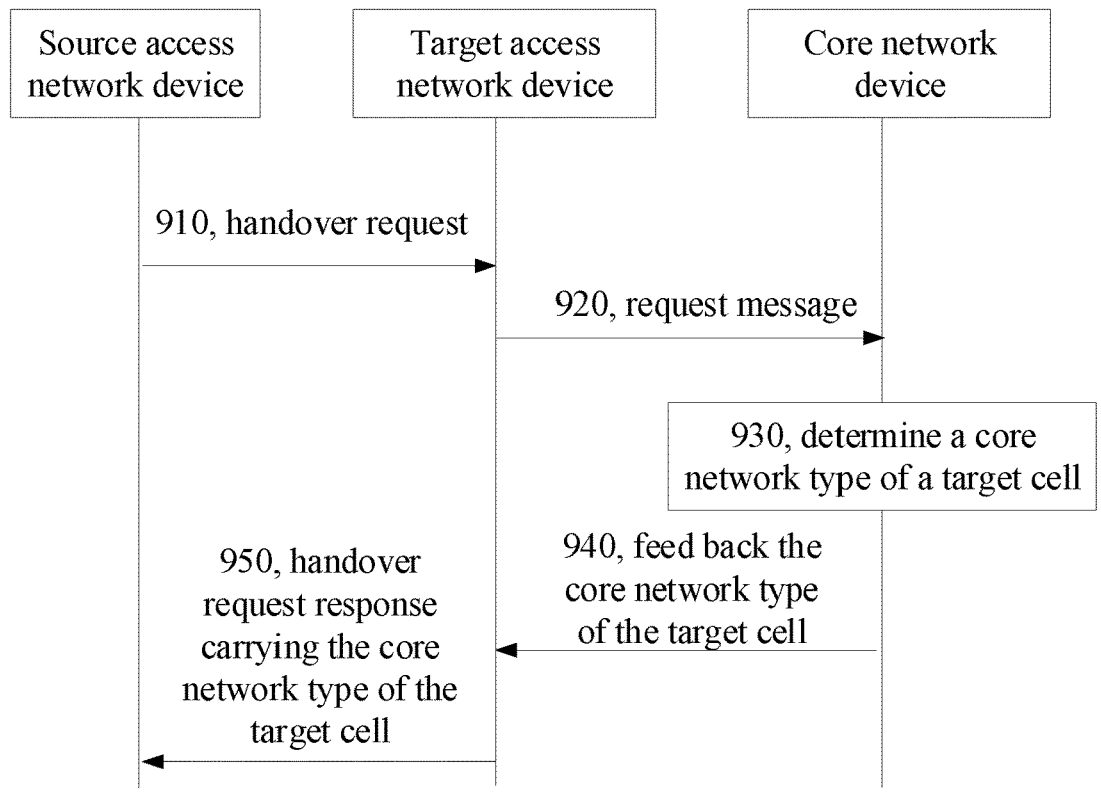
FIG. 10 illustrates a schematic flow chart of another handover process according to the embodiments of the disclosure.

Alternatively, as an embodiment, as illustrated in FIG. 10, the access network device is a target access network device. At this time, the target access network device sends a request message to the core network device, so that the core network device determines the core network type of the target cell. The specific process is illustrated in method 900.

In 910, during a handover of the terminal device from a source cell to a target cell, the source access network device sends a handover request to the target access network device.

In 920, the target access network device sends a request message to the core network device, where the request message is used to request a core network type of the target cell.

Optionally, the request message may carry some information about the terminal device, for example, identification information of the terminal device, and/or, a Global Cellular Identity (GCI) of the target cell.

In 930, the core network device determines a core network type of the target cell.

Optionally, the core network device may determine the core network type of the target cell according to at least one of the following: subscription information of the terminal device, evolved packet system (EPS) bearer information for the terminal device, protocol data unit (PDU) session information for the terminal device, or a quality of service (QoS) flow.

In 940, the core network device sends the core network type of the target cell to the target access network device.

Optionally, the target access network device may perform a subsequent cell handover according to the core network type of the target cell.

In 950, the target access network device sends a response message for the handover request to the source access network device, where the message carries the core network type of the target cell for subsequent cell handover.

It should be understood that the above method 900 corresponds to the corresponding steps in the method 700 and the method 800, and for the steps in the above method 900, the corresponding steps in the method 200 for determining the core network type during the handover process or the method 700 for determining the core network type during the handover process may be referred to. For brevity, details will not be repeated here.

Figure 11:
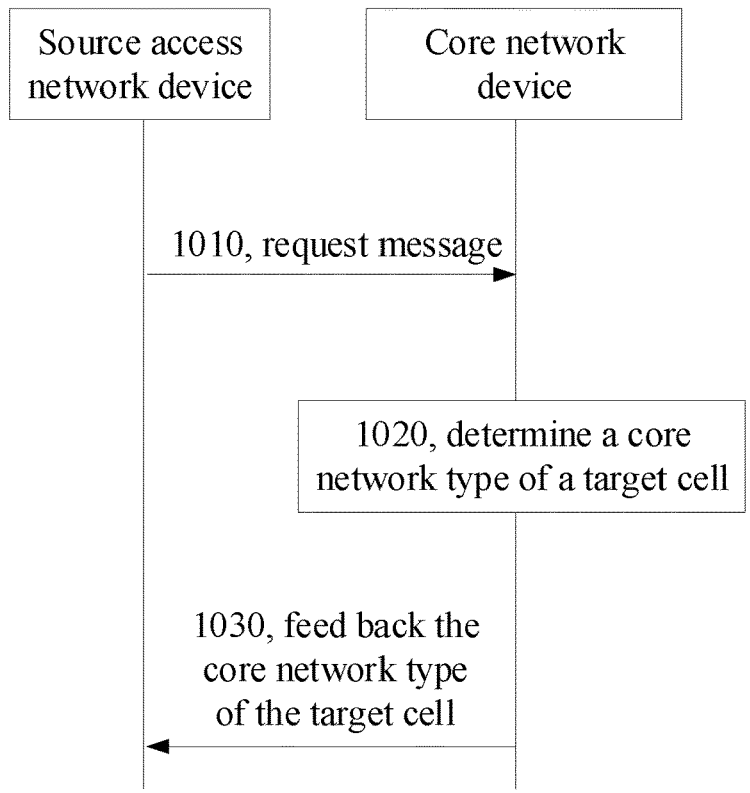
FIG. 11 illustrates a schematic flow chart of another handover process according to the embodiments of the disclosure.

Alternatively, as an embodiment, as illustrated in FIG. 11, the access network device is a source access network device. At this time, the source access network device sends a request message to the core network device, so that the core network device determines the core network type of the target cell. The specific process is illustrated in method 1000.

In 1010, during a handover of the terminal device from a source cell to a target cell, the source access network device sends a request message to the core network device, where the request message is used to request a core network type of the target cell.

Optionally, the request message may carry some information about the terminal device, for example, identification information of the terminal device, and/or the GCI of the target cell.

Optionally, the source access network device may send the request message to the core network device through an S1 interface or an N2 interface.

In 1020, the core network device determines the core network type of the target cell.

Optionally, the core network device may determine the core network type of the target cell according to at least one of the following: information of the preferred core network type, subscription information of the terminal device, evolved packet system (EPS) bearer information for the terminal device, protocol data unit (PDU) session information for the terminal device, or a quality of service (QoS) flow.

In 1030, the core network device sends the core network type of the target cell to the source access network device.

Optionally, the source access network device may perform a subsequent cell handover according to the core network type of the target cell.

Optionally, the core network device may be an MME or an HSS.

It should be understood that the above method 1000 corresponds to the corresponding steps in method 700 and method 800, and for the steps in the above method 1000, the corresponding method in method 200 for determining the core network type during the handover or the method 700 for determining the core network type during the handover may be referred to. For brevity, details will not be repeated here.

FIG. 12 illustrates a schematic flowchart of a method 1100 for determining a core network type during a handover process according to an embodiment of the disclosure. The method 1100 may be applied to the system illustrated in FIG. 1. In the method 1000, a terminal device, a source access network device, a target access network device, a source core network device, and a target core network device may meet the eLTE protocol layer architecture illustrated in FIG. 2, but is not limited thereto. The method 1100 includes at least a part of the following content.

In 1110, during a handover of the terminal device from a source cell to a target cell, the target access network device sends a request message to the target core network device, where the request message is used to request the core network type of the target cell.

In 1120, the target access network device receives the core network type of the target cell from the target core network device as a feedback for the request message.

Optionally, after receiving the request message, the target core network device may send the request message to the source core network device, so that the source core network device determines the core network type of the target cell according to at least one of the following: subscription information of the terminal device, evolved packet system (EPS) bearer information for the terminal device, protocol data unit (PDU) session information for the terminal device, or a quality of service (QoS) flow.

Optionally, the method 1100 may further include that, the target access network device performs cell handover according to the core network type of the target cell.

Optionally, the core network type information of the target cell may be evolved packet core (EPC), or 5G core network, or 5G core network and EPC.

Optionally, the source core network device may be an access and mobility management function (AMF), a mobility management entity (MME), a unified data manager (UDM), or a home subscriber server (HSS).

It should be understood that, for the steps in the method 1100 for determining the core network type during the handover, the description of the corresponding steps in the method 200 for determining the core network type during the handover or the method 700 for determining the core network type during the handover may be referred to. For brevity, details will not be repeated here.

Therefore, in the method for determining the core network type during the handover process in the embodiment of the disclosure, during the handover of the terminal device from the source cell to the target cell, the target core network device sends a request message for requesting the core network type of the target cell to the source core network device, so that the source core network device can determine the core network type of the target cell, thereby guaranteeing the smooth handover of the cell and improving the user experience.

FIG. 13 illustrates a schematic flowchart of a method 1200 for determining a core network type during a handover process according to an embodiment of the disclosure. The method 1200 may be applied to the system illustrated in FIG. 1. In the method 1200, a terminal device, a source access network device, a target access network device, a source core network device, and a target core network device may meet the eLTE protocol layer architecture illustrated in FIG. 2, but is not limited thereto. The method 1200 includes at least a part of the following content.

In 1210, during a handover of the terminal device from a source cell to a target cell, the target core network device sends a request message to the source core network device, where the request message is used to request a core network type of the target cell.

In 1220, the target core network device receives the core network type of the target cell from the source core network device as a feedback for the request message.

Optionally, before the target core network device may send the request message to the source core network device, the method 1200 further includes that, the target core network device receives the request message from the target access network device.

Optionally, the method 1200 may further include that, the target core network device sends the core network type of the target cell to the target access network device, so that the target access network device performs cell handover according to the core network type of the target cell.

Optionally, the core network type information of the target cell may be evolved packet core (EPC), or 5G core network, or 5G core network and EPC.

Optionally, the source core network device may be an access and mobility management function (AMF), a mobility management entity (MME), a unified data manager (UDM), or a home subscriber server (HSS).

Optionally, the target core network device may be an AMF, or an MME, or a UDM, or an HSS.

It should be understood that, for the steps in the method 1200 for determining the core network type during the handover, the description of the corresponding steps in the method 200 for determining the core network type during the handover or the method 700 for determining the core network type during the handover may be referred to. For brevity, details will not be repeated here.

Therefore, in the method for determining the core network type during the handover process in the embodiment of the disclosure, during the handover of the terminal device from the source cell to the target cell, the target core network device sends a request message for requesting the core network type of the target cell to the source core network device, so that the source core network device can determine the core network type of the target cell, thereby guaranteeing smooth running of the cell handover and improving the user experiences.

FIG. 14 illustrates a schematic flowchart of a method 1300 for determining a core network type during a handover process according to an embodiment of the disclosure. The method 1300 may be applied to the system illustrated in FIG. 1. In the method 1300, a terminal device, a source access network device, a target access network device, a source core network device, and a target core network device may meet the eLTE protocol layer architecture illustrated in FIG. 2, which, however is not limited thereto. The method 1300 includes at least a part of the following content.

In 1310, during a handover of the terminal device from a source cell to a target cell, the source core network device receives a request message from the target core network device. The request message is used to request a core network type of the target cell.

In 1320, the source core network device determines the core network type of the target cell according to at least one of the following: subscription information of the terminal device, evolved packet system (EPS) bearer information for the terminal device, protocol data unit (PDU) session information for the terminal device, or a quality of service (QoS) flow.

In 1330, the source core network device feeds the determined core network type of the target cell back to the target core network device.

Optionally, the core network type information of the target cell may be evolved packet core (EPC), or 5G core network, or 5G core network and EPC.

Optionally, the source core network device may be an access and mobility management function (AMF), a mobility management entity (MME), a unified data manager (UDM), or a home subscriber server (HSS).

Optionally, the target core network device may be an AMF, or an MME, or a UDM, or an HSS.

It should be understood that, for the steps in the method 1300 for determining the core network type during the handover, the description of the corresponding steps in the method 200 for determining the core network type during the handover or the method 700 for determining the core network type during the handover may be referred to. For brevity, details will not be repeated here.

Therefore, in the method for determining the core network type during the handover process in the embodiment of the disclosure, during the handover of the terminal device from the source cell to the target cell, the target core network device sends a request message for requesting the core network type of the target cell to the source core network device, so that the source core network device can determine the core network type of the target cell, thereby guaranteeing smooth running of the cell handover and improving the user experiences.

Figure 15:
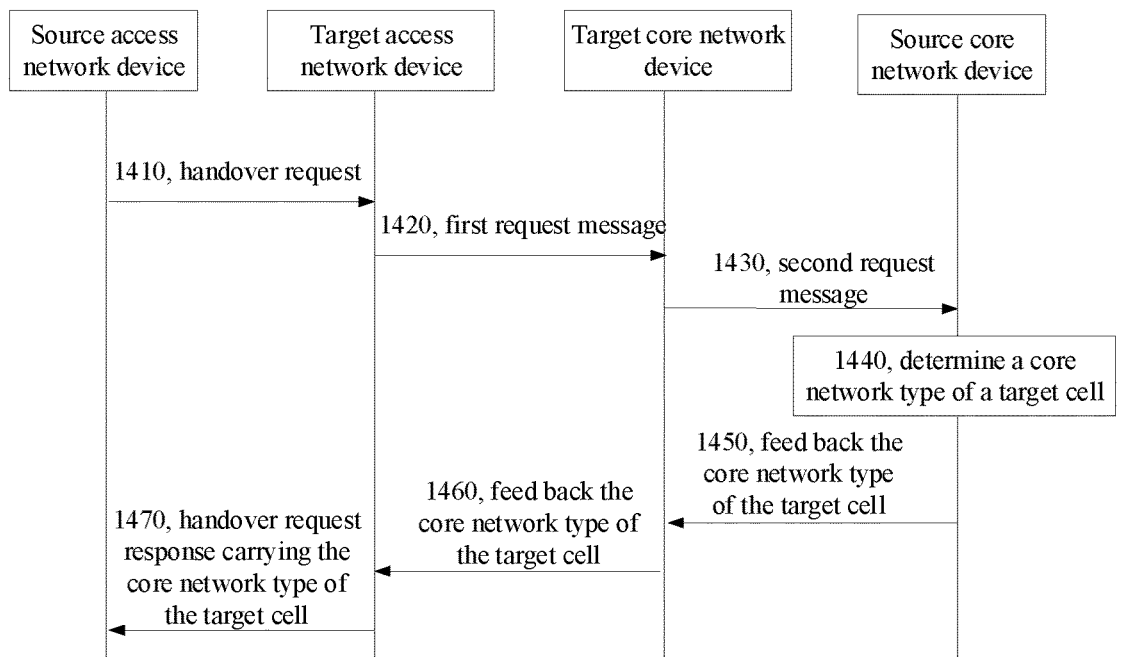
FIG. 15 illustrates a schematic flow chart of another handover process according to the embodiments of the disclosure.

Alternatively, as an embodiment, as illustrated in FIG. 15, a target access network device, a target core network device, and a source core network device perform information interaction, so that the source core network device determines a core network type of a target cell. The specific process is illustrated in method 1400.

In 1410, during a handover of a terminal device from a source cell to a target cell, the source access network device sends a handover request to the target access network device.

In 1420, the target access network device sends a first request message to the target core network device, where the first request message is used to request the core network type of the target cell.

Optionally, the first request message may carry some information about the terminal device, for example, identification information of the terminal device, and/or, a Global Cellular Identity (GCI) of the target cell.

In 1430, the target access network device sends a second request message to the source access network device, where the second request message is used to request a core network type of the target cell.

Optionally, the second request message and the first request message may be the same request message.

Optionally, the second request message and the first request message may be different request messages; and the information carried by the second request message and the first request message may be different, while their functions may be the same.

For example, the first request message may carry some related information of the terminal device, such as identification information of the terminal device, so that the target core network device can find the source core network device and implement information interaction.

In 1440, the source core network device determines the core network type of the target cell.

Optionally, the source core network device may determine the core network type of the target cell based on at least one of the following: information of subscription information of the terminal device, evolved packet system (EPS) bearer information for the terminal device, protocol data unit (PDU) session information for the terminal device, or a quality of service (QoS) flow.

In 1450, the source core network device feeds the determined core network type of the target cell back to the target access network device.

In 1460, the target core network device feeds the core network type of the target cell back to the target access network device.

Optionally, the target access network device may perform a subsequent cell handover according to the core network type of the target cell.

In 1470, the target access network device sends a response message for a handover request to the source access network device, where the message carries the core network type of the target cell for subsequent cell handover.

It should be understood that the above method 1400 corresponds to the corresponding steps in the method 1100, the method 1200, and the method 1300, and for the steps in the above method 1400, the method 200 for determining the core network type during the handover process or the method 700 for determining the core network type during the handover process may be referred to. For brevity, details will not be repeated here.

Figure 16:
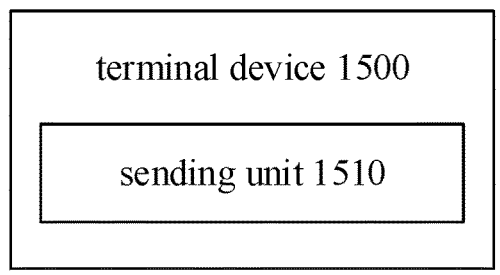
FIG. 16 illustrates a schematic block diagram of a terminal device according to the embodiments of the disclosure.

FIG. 16 illustrates a schematic block diagram of a terminal device 1500 according to an embodiment of the disclosure. As illustrated in FIG. 16, the terminal device 1500 includes a sending unit 1510.

The sending unit 1510 is configured to during a handover from a source cell to a target cell, send information of a preferred core network type for the target cell to a source access network device. The information of the preferred core network type is reference information for determining a core network type of the target cell.

Optionally, the terminal device 1500 may further include a non-access stratum device 1520 and an access stratum device 1530.

The non-access stratum device 1520 is configured to send the information of the preferred core network type to an access stratum of the terminal device.

The access stratum device 1530 is configured to send the information of the preferred core network type to the source access network device.

Optionally, the sending unit 1510 may further be configured to send a measurement report to the source access network device, wherein the measurement report carries the information of the preferred core network type.

Optionally, the information of the preferred core network type may be evolved packet core (EPC), or 5G core network, or 5G core network and EPC.

It should be understood that the terminal device 1500 according to the embodiment of the disclosure may correspond to the terminal device in the method 200 of the disclosure, and the above and other operations and/or functions of each unit in the terminal device 1500 are to implement the corresponding process of the terminal device in the method 200 illustrated in FIG. 3. For brevity, details will not be repeated here.

Figure 17:
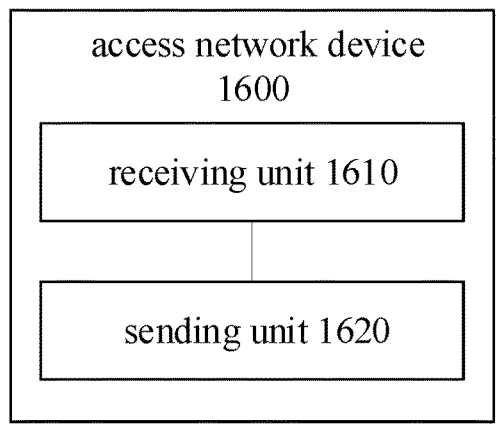
FIG. 17 illustrates a schematic block diagram of an access device according to the embodiments of the disclosure.

FIG. 17 illustrates a schematic block diagram of an access network device 1600 according to an embodiment of the disclosure. As illustrated in FIG. 17, the access network device 1600 includes a receiving unit 1610 and a sending unit 1620.

The receiving unit 1610 is configured to, during a handover, of a terminal device, from a source cell to a target cell, receive information of a preferred core network type for the target cell from the terminal device. The information of the preferred core network type is reference information for determining the core network type of the target cell.

The sending unit 1620 is configured to send the information of the preferred core network type to a target access network device.

Optionally, the receiving unit 1610 may further be configured to receive the information of the preferred core network type from an access stratum of the terminal device.

Optionally, the receiving unit 1610 may further be configured to receive a measurement report which carries the information of the preferred core network type from the terminal device.

Optionally, the sending unit 1620 may further be configured to send a handover request which comprises the information of the preferred core network type to the target access network device.

Optionally, the information of the preferred core network type may be evolved packet core (EPC), or 5G core network, or 5G core network and EPC.

It should be understood that the access network device 1600 according to the embodiment of the disclosure may correspond to the source access network device in the method 300 of the disclosure, and the above and other operations and/or functions of the units in the access network device 1600 are to implement the corresponding process of the source access network device in the method 300 illustrated in FIG. 4. For brevity, details will not be repeated here.

Figure 18:
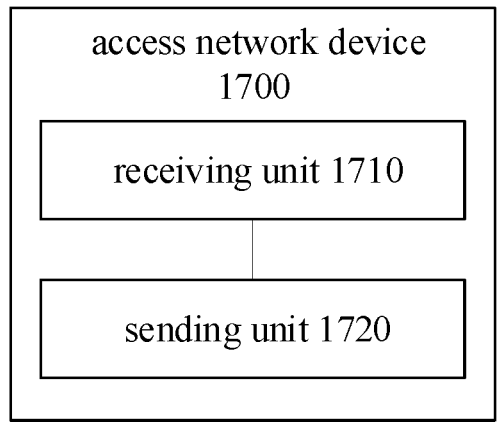
FIG. 18 illustrates a schematic block diagram of another access device according to the embodiments of the disclosure.

FIG. 18 illustrates a schematic block diagram of an access network device 1700 according to an embodiment of the disclosure. As illustrated in FIG. 18, the access network device 1700 includes a receiving unit 1710 and a sending unit 1720.

The receiving unit 1710 is configured to during a handover, of a terminal device, from a source cell to a target cell, receive information of a preferred core network type for the target cell from a source access network device. The information of the preferred core network type is reference information for determining the core network type of the target cell.

The sending unit 1720 is configured to send the information of the preferred core network type to the core network device, to enable the core network device to determine a core network type of the target cell according to the information of the preferred core network type.

Optionally, the receiving unit 1710 may further be configured to receive a handover request from the source access network device, where the handover request includes the information of the preferred core network type.

Optionally, the information of the preferred core network type may be evolved packet core (EPC), or 5G core network, or 5G core network and EPC.

Optionally, the access network device 1700 further includes the receiving unit 1710.

The receiving unit 1710 is further configured to receive a core network type of the target cell from the core network device.

The processing unit 1730 is configured to perform cell handover according to the core network type of the target cell.

It should be understood that the access network device 1700 according to the embodiment of the disclosure may correspond to the target access network device in the method 400 of the disclosure, and the above and other operations and/or functions of each unit in the access network device 1700 are to implement the corresponding process of the target access network device in the method 400 illustrated in FIG. 5. For brevity, details will not be repeated here.

Figure 19:
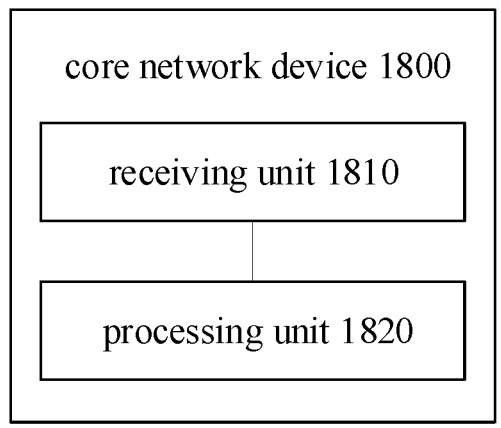
FIG. 19 illustrates a schematic block diagram of a core device according to the embodiments of the disclosure.

FIG. 19 illustrates a schematic block diagram of a core network device 1800 according to an embodiment of the disclosure. As illustrated in FIG. 19, the core network device 1800 includes a receiving unit 1810 and a processing unit 1820.

The receiving unit 1810 is configured to during a handover, of a terminal device, from a source cell to a target cell, receive information of a preferred core network type for the target cell from a target access network device. The information of the preferred core network type is reference information for determining the core network type of the target cell.

The processing unit 1820 is configured to determine a core network type of the target cell according to the information of the preferred core network type.

Optionally, the processing unit 1820 may further be configured to determine the core network type of the target cell according to at least one of the following: the information of the preferred core network type, subscription information of the terminal device, evolved packet system (EPS) bearer information for the terminal device, protocol data unit (PDU) session information for the terminal device, or a quality of service (QoS) flow.

Optionally, the information of the preferred core network type may be evolved packet core (EPC), or 5G core network, or 5G core network and EPC.

Optionally, the core network device 1800 may further include a sending unit 1830.

The sending unit 1830 is configured to feed the determined core network type of the target cell back to the target access network device.

It should be understood that the core network device 1800 according to the embodiment of the disclosure may correspond to the core network device in the method 500 of the disclosure, and the above and other operations and/or functions of each unit in the core network device 1800 are to implement the corresponding process of the core network device in the method 500 illustrated in FIG. 6. For brevity, details will not be repeated here.

Figure 20:
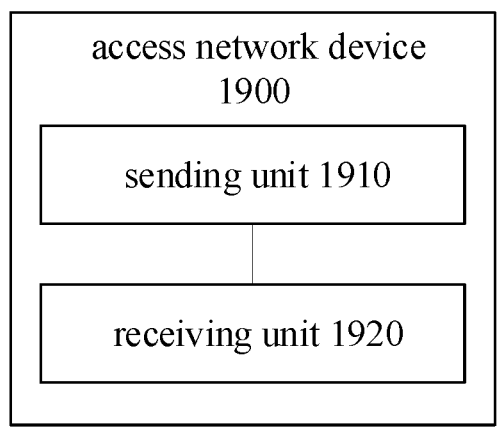
FIG. 20 illustrates a schematic block diagram of another access device according to the embodiments of the disclosure.

FIG. 20 illustrates a schematic block diagram of an access network device 1900 according to an embodiment of the disclosure. As illustrated in FIG. 20, the access network device 1900 includes a sending unit 1910 and a receiving unit 1920.

The sending unit 1910 is configured to send a request message to a core network device during a handover of a terminal device from a source cell to a target cell, where the request message is used to request a core network type of the target cell. During the handover of the terminal device from the source cell to the target cell, the core network device is unchanged.

The receiving unit 1920 is configured to receive the core network type of the target cell from the core network device as a feedback for the request message.

Optionally, the access network device 1900 may further include a processing unit 1930

The processing unit 1930 is configured to perform cell handover according to the core network type of the target cell.

Optionally, the core network type information of the target cell may be EPC, or 5G core network, or 5G core network and EPC.

Optionally, the core network device may be an access and mobility management function (AMF), a mobility management entity (MME), a unified data manager (UDM), or a home subscriber server (HSS).

It should be understood that the access network device 1900 according to the embodiment of the disclosure may correspond to the access network device in the method 700 of the disclosure, and the above and other operations and/or functions of each unit in the access network device 1900 are to implement he corresponding process of the access network device in the method 700 illustrated in FIG. 8. For brevity, details will not be repeated here.

Figure 21:
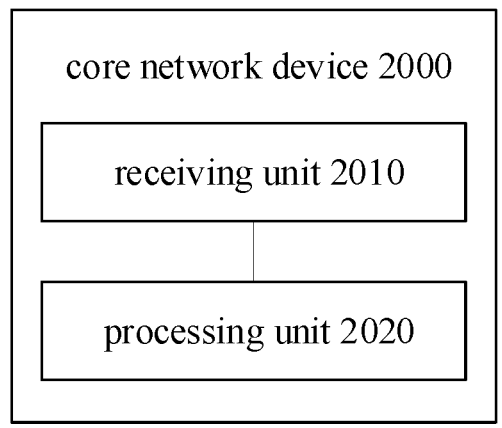
FIG. 21 illustrates a schematic block diagram of another core device according to the embodiments of the disclosure.

FIG. 21 illustrates a schematic block diagram of a core network device 2000 according to an embodiment of the disclosure. As illustrated in FIG. 21, the core network device 2000 includes a receiving unit 2010 and a processing unit 2020.

The receiving unit 2010 is configured to receive a request message sent by an access network device during a handover of a terminal device from a source cell to a target cell, where the request message is used to request a core network type of the target cell. During the handover of the terminal device from the source cell to the target cell, the core network device is unchanged.

The processing unit 2020 is configured to, after the receiving unit receives the request message, the core network device determine the core network type of the target cell according to at least one of the following: subscription information of the terminal device, evolved packet system (EPS) bearer information for the terminal device, protocol data unit (PDU) session information for the terminal device, or a quality of service (QoS) flow.

Optionally, the core network device 2000 may further include a sending unit 2030.

The sending unit 2030 is configured to feed the core network type of the target cell back to the access network device.

Optionally, the core network type information of the target cell may be EPC, or 5G core network, or 5G core network and EPC.

Optionally, the core network device may be an access and mobility management function (AMF), a mobility management entity (MME), a unified data manager (UDM), or a home subscriber server (HSS).

It should be understood that the core network device 2000 according to the embodiment of the disclosure may correspond to the core network device in the method 800 of the disclosure, and the above and other operations and/or functions of each unit in the core network device 2000 are to implement the corresponding process of the core network device in the method 800 illustrated in FIG. 9. For brevity, details will not be repeated here.

Figure 22:
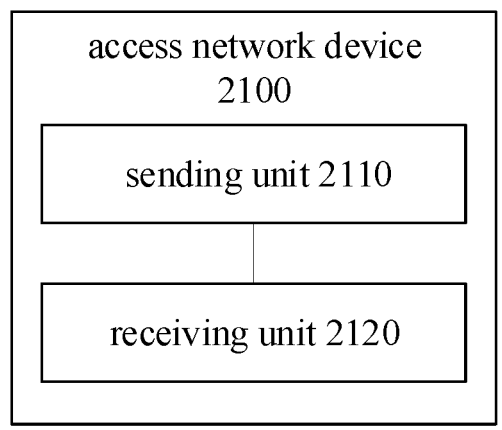
FIG. 22 illustrates a schematic block diagram of another access device according to the embodiments of the disclosure.

FIG. 22 illustrates a schematic block diagram of an access network device 2100 according to an embodiment of the disclosure. As illustrated in FIG. 22, the access network device 2100 includes a sending unit 2110 and a receiving unit 2120.

The sending unit 2110 is configured to send a request message to a target core network device during a handover of a terminal device from a source cell to a target cell, where the request message is used to request a core network type of the target cell.

The receiving unit 2120 is configured to receive a core network type of the target cell from the target core network device as a feedback for the request message.

Optionally, the access network device 2100 may further include\s a processing unit 2130.

The processing unit 2130 is configured to perform cell handover according to the core network type of the target cell.

Optionally, the core network type information of the target cell may be EPC, or 5G core network, or 5G core network and EPC.

Optionally, the core network device may be an access and mobility management function (AMF), a mobility management entity (MME), a unified data manager (UDM), or a home subscriber server (HSS).

It should be understood that the access network device 2100 according to the embodiment of the disclosure may correspond to the target access network device in the method 1100 of the disclosure, and the above and other operations and/or functions of each unit in the access network device 2100 are to implement the corresponding process of the target access network device in the method 1100 illustrated in FIG. 12. For brevity, details will not be repeated here.

Figure 23:
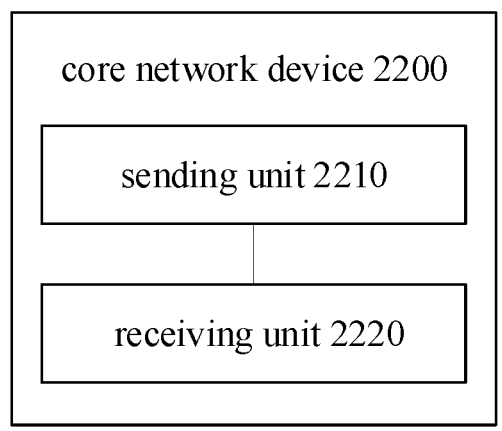
FIG. 23 illustrates a schematic block diagram of another core device according to the embodiments of the disclosure.

FIG. 23 illustrates a schematic block diagram of a core network device 2200 according to an embodiment of the disclosure. As illustrated in FIG. 23, the core network device 2200 includes a sending unit 2210 and a receiving unit 2220.

The sending unit 2210 is configured, to send a request message to a source core network device during a handover of a terminal device from a source cell to a target cell, where the request message is used to request a core network type of the target cell.

The receiving unit 2220 is configured to receive a core network type of the target cell from the source core network device as a feedback for the request message.

Optionally, before the sending unit 2210 sends the request message to the source core network device, the receiving unit 2220 may further be configured to receive the request message from the target access network device.

Optionally, the sending unit 2210 may further be configured to send the core network type of the target cell to the target access network device, so that the target access network device performs cell handover according to the core network type of the target cell.

Optionally, the core network type information of the target cell may be EPC, or 5G core network, or 5G core network and EPC.

Optionally, the source core network device may be an access and mobility management function (AMF), a mobility management entity (MME), a unified data manager (UDM), or a home subscriber server (HSS).

Optionally, the core network device may be an AMF, or an MME, or a UDM, or an HSS.

It should be understood that the core network device 2200 according to the embodiment of the disclosure may correspond to the target core network device in the method 1200 of the disclosure, and the above and other operations and/or functions of each unit in the core network device 2200 are to implement the corresponding process of the target core network device in the method 1200 illustrated in FIG. 13. For brevity, details will not be repeated here.

Figure 24:
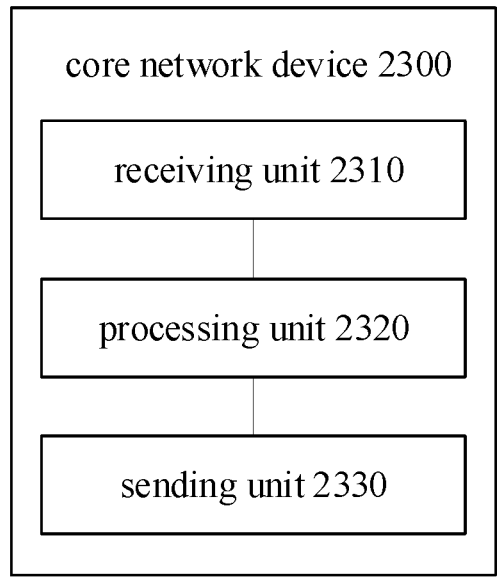
FIG. 24 illustrates a schematic block diagram of another core device according to the embodiments of the disclosure.

FIG. 24 is a schematic block diagram of a core network device 2300 according to an embodiment of the disclosure. As illustrated in FIG. 24, the core network device 2300 includes a receiving unit 2310, a processing unit 2320, and a sending unit 2330.

The receiving unit 2310 is configured to receive a request message sent by a target core network device during a handover of a terminal device from a source cell to a target cell, where the request message is used to request a core network type of the target cell.

The processing unit 2320 is configured to determine the core network type of the target cell according to at least one of the following: subscription information of the terminal device, evolved packet system (EPS) bearer information for the terminal device, protocol data unit (PDU) session information for the terminal device, or a quality of service (QoS) flow.

The sending unit 2330 is configured to feed the determined core network type of the target cell back to the target core network device.

Optionally, the core network type information of the target cell may be EPC, or 5G core network, or 5G core network and EPC.

Optionally, the core network device may be an access and mobility management function (AMF), a mobility management entity (MME), a unified data manager (UDM), or a home subscriber server (HSS).

Optionally, the target core network device may be an AMF, or an MME, or a UDM, or an HSS.

It should be understood that the core network device 2300 according to the embodiment of the disclosure may correspond to the source core network device in the method 1300 of the disclosure, and the above and other operations and/or functions of each unit in the core network device 2300 are to implement the corresponding process of the source core network device in the method 1300 illustrated in FIG. 14. For brevity, details will not be repeated here.

Figure 25:
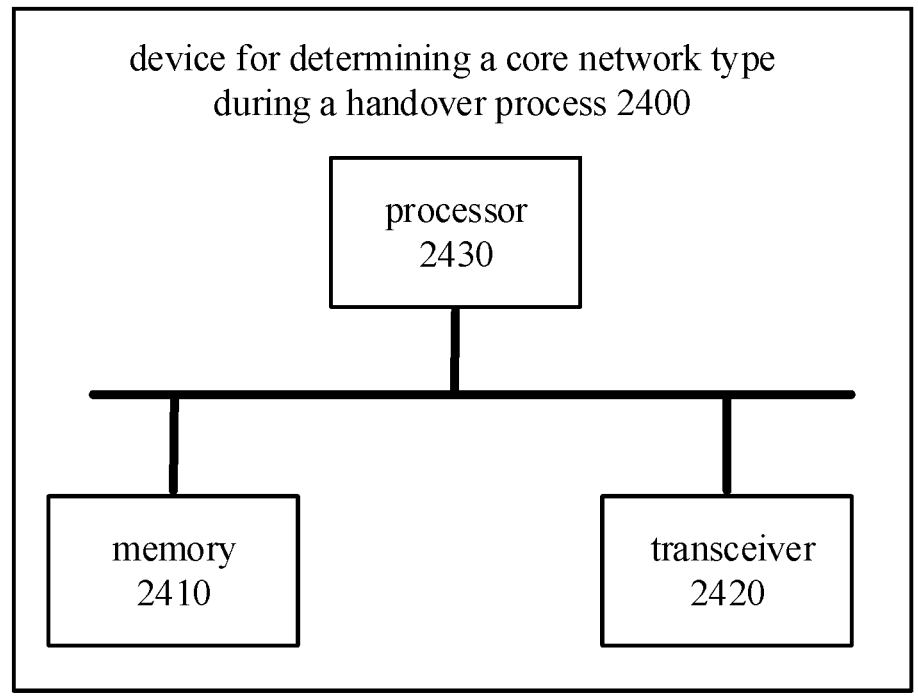
FIG. 25 illustrates a schematic flow chart of determining a core network type during another handover process according to the embodiments of the disclosure.

FIG. 25 shows a schematic block diagram of a device 2400 for determining a core network type during a handover process according to an embodiment of the disclosure. The device 2400 includes a memory 2410, a transceiver 2420, and a processor 2430.

The memory 2410 is configured to store a program including a code.

The transceiver 2420 is configured to communicate with other devices.

The processor 2430 is configured to execute the program code in the memory 2410.

Optionally, when the code is executed, the processor 2430 may implement the method 200 in FIG. 3, or various operations performed by the terminal device in the method 600 in FIG. 7. For brevity, details will not be repeated here. At this time, the device 2400 may be a terminal device (for example, a mobile phone). The transceiver 2420 is configured to perform specific signal transceiving under the driving of the processor 2430.

Optionally, when the code is executed, the processor 2430 may implement the method 300 in FIG. 4, or the method 400 in FIG. 5, or the method 600 in FIG. 7, or the method 700 in FIG. 8, or the method 900 in FIG. 10, or the method 1000 in FIG. 11, or the method 1100 in FIG. 12, or the various operations performed by the access network device in the method 1400 in FIG. 15. For brevity, details will not be repeated here. At this time, the device 2400 may be an access network device (for example, a base station).

Optionally, when the code is executed, the processor 2430 may further implement the method 500 in FIG. 6, or method 600 in FIG. 7, or method 800 in FIG. 9, or method 900 in FIG. 10, or the method 1000 in FIG. 11 or the method 1200 in FIG. 13, or various operations performed by the core network device, or the source core network device, or the target core network device in the method 1400 in FIG. 15. For brevity, details will not be repeated here. At this time, the device 2400 may be a core network device (for example, an MME or an AMF).

It should be understood that, in the embodiment of the disclosure, the processor 2430 may be a Central Processing Unit (CPU), or the processor 2430 may be another general-purpose processor, a digital signal processor (DSP), or an application-specific integrated circuit (ASIC), a field programmable gate array (FPGA) or other programmable logic devices, discrete gate or transistor logic devices, discrete hardware components, etc. A general-purpose processor may be a microprocessor, or the processor may be any conventional processor or the like.

The memory 2410 may include a read-only memory and a random access memory, and provide instructions and data to the processor 2430. A part of the memory 2410 may further include a non-volatile random access memory. For example, the memory 2410 may further store device type information.

The transceiver 2420 may be used to implement signal transmission and reception functions, such as frequency modulation and demodulation functions, which are also called up-conversion and down-conversion functions.

In the implementation process, at least one step of the above method may be completed by an integrated logic circuit of hardware in the processor 2430, or the integrated logic circuit may complete the at least one step under instructions in a software form. Therefore, the device 2400 that determines the core network type during the handover process may be a chip or a chipset. The steps of the method disclosed in combination with the embodiments of the disclosure may be directly implemented by a hardware processor, or may be performed by a combination of hardware and software modules in the processor. The software module may be located in a mature storage medium such as a random access memory, a flash memory, a read-only memory, a programmable read-only memory, or an electrically erasable programmable memory, a register, and the like. The storage medium is located in a memory, and the processor 2430 reads information in the memory and completes the steps of the foregoing method in combination with hardware. To avoid repetition, details will not be described here.

Figure 26:
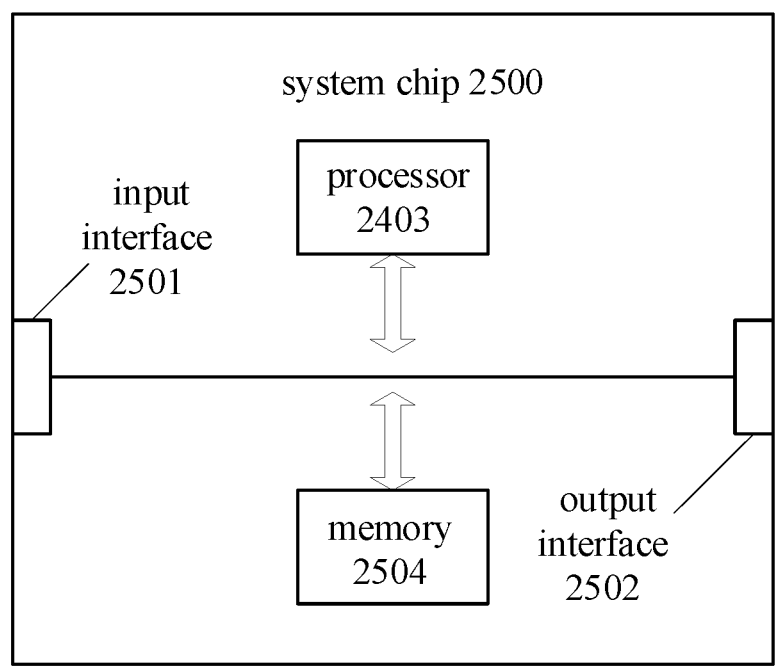
FIG. 26 illustrates a schematic structure diagram of a system chip according to the embodiments of the disclosure.

FIG. 26 is a schematic structural diagram of a system chip 2500 according to an embodiment of the disclosure. The system chip 2500 illustrated in FIG. 26 includes an input interface 2501, an output interface 2502, a processor 2503, and a memory 2504. The processor 2503 is configured to execute a code in the memory 2504.

Optionally, when the code is executed, the processor 2503 may implement the methods executed by the terminal device in the method embodiments. For brevity, details will not be repeated here.

Optionally, when the code is executed, the processor 2503 may implement the methods executed by the access network device in the method embodiments. For brevity, details will not be repeated here.

Optionally, when the code is executed, the processor 2503 may implement the methods executed by the core network device in the method embodiments. For brevity, details will not be repeated here.

Those of ordinary skill in the art may realize that the units and algorithm steps of each example described in connection with the embodiments disclosed herein can be implemented by electronic hardware, or a combination of computer software and electronic hardware. Whether these functions are performed in hardware or software depends on the specific application and design constraints of the technical solution. Professional technicians may use different methods to implement the described functions for each specific application, but such an implementation should not be considered as going beyond the scope of the disclosure.

Those skilled in the art can clearly understand that, for convenience and brevity of description, the specific operating processes of the systems, devices, and units described above can refer to the corresponding processes in the foregoing method embodiments, and are not repeated here.

In the embodiments provided in the disclosure, it should be understood that the disclosed systems, devices, and methods may be implemented in other ways. For example, the device embodiments described above are only schematic. For example, the division of the units is only a logical function division. In actual implementation, there may be another division manner. For example, multiple units or components may be combined or integrated into another system, or some features can be ignored or not implemented. In addition, the illustrated or discussed mutual coupling or direct coupling or communication connection may be indirect coupling or communication connection through some interfaces, devices or units in electrical, mechanical or other forms.

The units described as separate components may or may not be separated physically, and the components illustrated as units may or may not be physical units, may be located in one place, or may be distributed in multiple network units. Some or all of the units may be selected as desired to achieve the objective of the solution of this embodiment.

In addition, various functional units in each embodiment of the disclosure may be integrated into one processing unit, or each of the units may exist separately physically, or two or more units may be integrated into one unit.

If the functions are implemented in the form of software functional units and sold or used as independent products, they can be stored in a computer-readable storage medium. Based on this understanding, the technical solution of the disclosure is essentially a part that contributes to the existing technology or a part of the technical solution can be embodied in the form of a software product. The computer software product is stored in a storage medium, including instructions that cause a computer device (which may be a personal computer, a server, or a network device, etc.) to perform all or part of the steps of the method described in each embodiment of the disclosure. The foregoing storage media include: U disks, mobile hard disks, read-only memory (ROM), random access memory (RAM), magnetic disks, or optical disks and other media that can store program codes.

The above are merely specific implementations of the disclosure, and the scope of the disclosure is not limited thereto. Any person skilled in the art can easily think of changes or replacements within the technical scope disclosed in the disclosure, which should be included in the scope of the disclosure. Therefore, the scope of the disclosure shall be subjected to the scope of the claims.

The invention claimed is:

1. A method for determining a core network type during a handover process, comprising:
   during a handover, of a terminal device, from a source cell to a target cell, sending, by the terminal device, information of a preferred core network type for the target cell to a source access network device, wherein the information of the preferred core network type is reference information for determining a core network type of the target cell, and
   receiving, by the terminal device, response information from the source access network device to perform handover, wherein the response information carries a core network type of the target cell, and the core network type of the target cell is determined by referring to the information of the preferred core network type for the target cell, and
   wherein the information of the preferred core network type is:
   a 5th generation (5G) core network, or
   the 5G core network and the EPC network,
   wherein when the information of the preferred core network type comprises the 5G core network, the core network device comprises an access and mobility management function (AMF) and does not comprise a mobility management entity (MME),
   wherein the sending, by the terminal device, the information of the preferred core network type for the target cell to the source access network device comprises:
   sending, by the terminal device, a measurement report to the source access network device, wherein the measurement report carries the information of the preferred core network type.

2. The method according to claim 1, wherein the sending, by the terminal device, the information of the preferred core network type for the target cell to the source access network device, comprising:
   sending, by a non-access stratum of the terminal device, the information of the preferred core network type to an access stratum of the terminal device; and
   sending, by the access stratum of the terminal device, the information of the preferred core network type to the source access network device.

3. A terminal device, which comprises:
   a transceiver, configured to, during a handover from a source cell to a target cell, send information of a preferred core network type for the target cell to a source access network device, wherein the information of the preferred core network type is reference information for determining a core network type of the target cell,
   wherein the transceiver is further configured to receive response information from the source access network device to perform handover, wherein the response information carries a core network type of the target cell, and the core network type of the target cell is determined by referring to the information of the preferred core network type for the target cell, and
   wherein the information of the preferred core network type is:
   a 5th generation (5G) core network; or
   the 5G core network and the EPC network,
   wherein when the information of the preferred core network type comprises the 5G core network, the core network device comprises an access and mobility management function (AMF) and does not comprise a mobility management entity (MME),
   wherein the transceiver is further configured to send a measurement report to the source access network device, wherein the measurement report carries the information of the preferred core network type.

4. The terminal device according to claim 3, further comprising:
   a processor; and
   a memory storing instructions executed by the processor;
   wherein the instructions comprise:
   a non-access stratum, configured to send the information of the preferred core network type to an access stratum of the terminal device; and
   an access stratum, configured to send the information of the preferred core network type to the source access network device.

* * * * *